United States Patent
Shibai et al.

(10) Patent No.: US 12,235,542 B2
(45) Date of Patent: Feb. 25, 2025

(54) PARTITIONING MEMBER, PLANAR LIGHT SOURCE, AND LIQUID CRYSTAL DISPLAY DEVICE

(71) Applicant: NICHIA CORPORATION, Anan (JP)

(72) Inventors: Koki Shibai, Tokushima (JP);
Yoshihiro Sho, Fujiyoshida (JP);
Motokazu Yamada, Tokushima (JP);
Naoya Kashiwagi, Tokushima (JP);
Shimpei Sasaoka, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/536,090

(22) Filed: Dec. 11, 2023

(65) Prior Publication Data

US 2024/0118572 A1 Apr. 11, 2024

Related U.S. Application Data

(63) Continuation of application No. 17/837,984, filed on Jun. 10, 2022, now Pat. No. 11,868,005.

(30) Foreign Application Priority Data

Jun. 15, 2021 (JP) .................. 2021-099711
Dec. 24, 2021 (JP) .................. 2021-211382

(51) Int. Cl.
*G02F 1/13357* (2006.01)
*F21V 7/00* (2006.01)

(52) U.S. Cl.
CPC .. *G02F 1/133605* (2013.01); *G02F 1/133603* (2013.01); *F21V 7/0083* (2013.01)

(58) Field of Classification Search
CPC ......... G02F 1/133605; G02F 1/133603; F21V 7/04; F21V 7/0083; G02B 17/002
See application file for complete search history.

(56) References Cited

U.S. PATENT DOCUMENTS

| 10,534,219 B2 * | 1/2020 | Lee ................. G02F 1/133609 |
| 2010/0141867 A1 * | 6/2010 | Ogihara ............ G02F 1/133605 349/61 |

(Continued)

FOREIGN PATENT DOCUMENTS

| CN | 109285929 A * | 1/2019 | .......... G02F 1/1336 |
| EP | 3273297 A1 | 1/2018 | |

(Continued)

OTHER PUBLICATIONS

Restriction Requirement in the related U.S. Appl. No. 17/837,984, dated Jan. 27, 2023.

(Continued)

*Primary Examiner* — Erin Kryukova
(74) *Attorney, Agent, or Firm* — Global IP Counselors, LLP

(57) ABSTRACT

A planar light source includes a substrate, light sources, and at least one partitioning member. The partitioning member includes first wall parts, second wall parts, and partitioned regions. The first wall parts define first ridges extending in a first direction. The second wall parts define second ridges extending in a second direction. The partitioned regions each is surrounded by the first ridges and the second ridges in a plan view. the partitioned regions are arranged in the first and second directions. At least one first cut is defined on at least one of the first ridges. At least one second cut is defined on at least one of the second ridges. The at least one first cut and the at least one second cut are spaced apart from each other. At least one of the light sources is arranged in a corresponding one of the partitioned regions.

16 Claims, 19 Drawing Sheets

(56) References Cited

U.S. PATENT DOCUMENTS

| | | | |
|---|---|---|---|
| 2017/0343187 A1* | 11/2017 | Nakamura | G02F 1/133603 |
| 2018/0107068 A1* | 4/2018 | Sasaki | G02F 1/133603 |
| 2018/0217448 A1* | 8/2018 | Mifune | G02F 1/133603 |
| 2019/0310516 A1 | 10/2019 | Kyoukane et al. | |

FOREIGN PATENT DOCUMENTS

| | | | |
|---|---|---|---|
| JP | 2017045559 A | * | 3/2017 |
| JP | 2017-157278 A | | 9/2017 |
| JP | 2018-125137 A | | 8/2018 |
| JP | 2019-185921 A | | 10/2019 |
| JP | 2020-119711 A | | 8/2020 |
| JP | 2021-015796 A | | 2/2021 |

OTHER PUBLICATIONS

Non Final Office Action in the related U.S. Appl. No. 17/837,984, filed Apr. 20, 2023.

* cited by examiner

Fig. 11
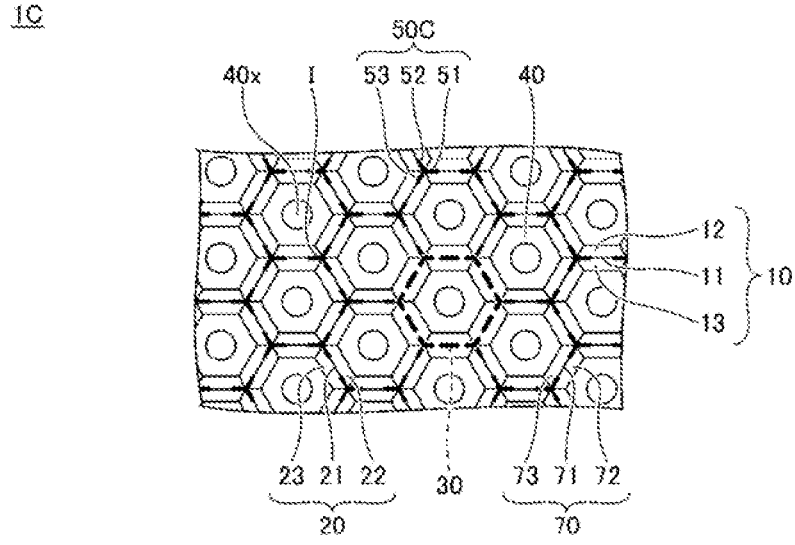
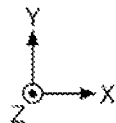

Fig. 12
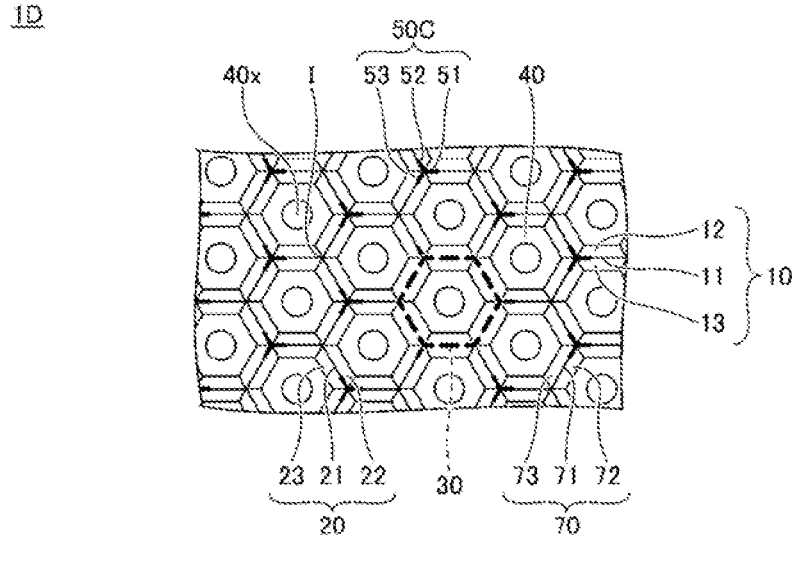
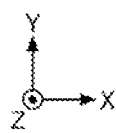

Fig. 18
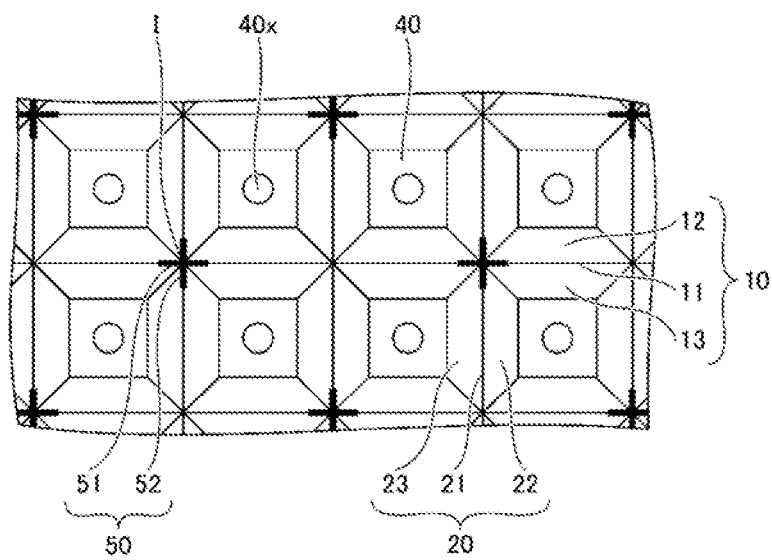
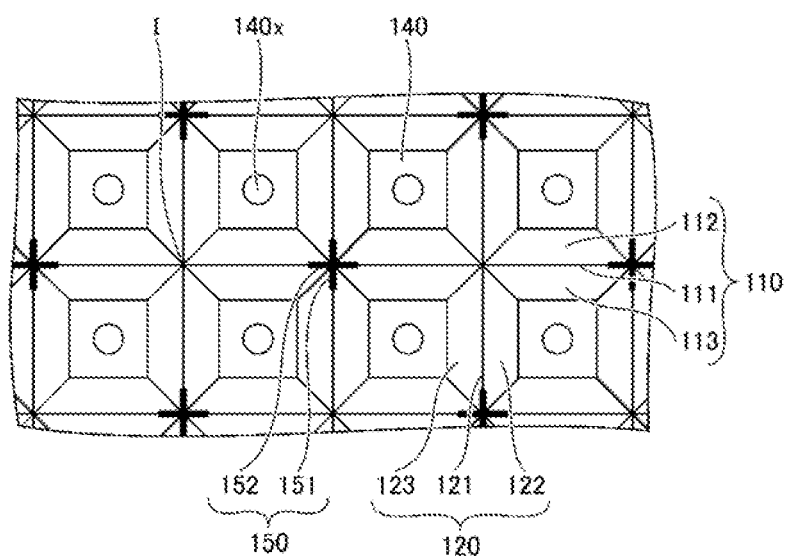

PARTITIONING MEMBER, PLANAR LIGHT SOURCE, AND LIQUID CRYSTAL DISPLAY DEVICE

CROSS-REFERENCE TO RELATED APPLICATION

This is a continuation application of U.S. patent application Ser. No. 17/837,984 filed on Jun. 10, 2022. This application claims priority to Japanese Patent Application No. 2021-099711 filed on Jun. 15, 2021, and Japanese Patent Application No. 2021-211382 filed on Dec. 24, 2021. The entire disclosures of U.S. patent application Ser. No. 17/837,984 and Japanese Patent Application Nos. 2021-099711 and 2021-211382, are hereby incorporated herein by reference.

BACKGROUND

The present disclosure relates to a partitioning member, a planar light source, and a liquid crystal display device.

A lighting device including a substrate, on which light emitting elements are arranged, and a reflective member disposed on the substrate has been known. In such a lighting device, the light emitting elements are individually disposed in the openings created in the reflective member. In such a lighting device, the reflective member undergoes thermal shrinkage under high temperature conditions to thereby cause luminance non-uniformity. As such, various measures have been proposed to reduce the impact of the thermal shrinkage of the reflective member. See, for example, Japanese Patent Publication No. 2019-185921.

SUMMARY

One object of the present disclosure is to reduce the thermal shrinkage of the partitioning member used in a planar light source.

A planar light source according to one embodiment of the present disclosure includes a substrate, a plurality of light sources, and at least one partitioning member. The light sources are arranged on the substrate. The partitioning member is disposed on the substrate. The partitioning member includes a plurality of first wall parts, a plurality of second wall parts, and a plurality of partitioned regions. The first wall parts define a plurality of first ridges extending in a first direction. The second wall parts define a plurality of second ridges extending in a second direction that intersects the first direction. The partitioned regions each includes an opposing pair of the first wall parts and an opposing pair of the second wall parts, and is surrounded by the first ridges and the second ridges in a plan view. the partitioned regions are arranged in the first direction and in the second direction. At least one first cut is defined on at least one of the first ridges. At least one second cut is defined on at least one of the second ridges. The at least one first cut and the at least one second cut are spaced apart from each other in the plan view. At least one of the light sources is arranged in a corresponding one of the partitioned regions.

A planar light source according to another embodiment of the present disclosure includes a substrate, a plurality of light sources arranged on the substrate, and at least one partitioning member. The at least one partitioning member is disposed on the substrate and defines a plurality of hexagonal partitioned regions arranged in a honeycomb pattern in a plan view. At least one of the light sources is arranged in a corresponding one of the hexagonal partitioned regions. The at least one partitioning member includes a plurality of first wall parts defining a plurality of first ridges extending in a first direction, a plurality of second wall parts defining a plurality of second ridges extending in a second direction that intersects the first direction, and a plurality of third wall parts defining a plurality of third ridges extending in a third direction different from the first direction and the second direction. The first wall parts define at least one first cut on at least one of the first ridges. Each of the hexagonal partitioned regions is defined by linking the first ridges, the second ridges, and the third ridges.

A partitioning member according to another embodiment of the present disclosure includes a plurality of first wall parts, a plurality of second wall parts, and a plurality of partitioned regions. The first wall parts define a plurality of first ridges extending in a first direction. The second wall parts define a plurality of second ridges extending in a second direction that intersects the first direction. The partitioned regions each includes an opposing pair of the first wall parts and an opposing pair of the second wall parts, and is surrounded by the first ridges and the second ridges in a plan view. The partitioned regions are arranged in the first direction and in the second direction. At least one first cut is defined on at least one of the first ridges. At least one second cut is defined on at least one of the second ridges. The at least one first cut and the at least one second cut are spaced apart from each other in the plan view.

According to an embodiment of the present disclosure, in a planar light source including a partitioning member, the thermal shrinkage of the partitioning member can be reduced. Furthermore, a partitioning member for use in such a planar light source, and a liquid crystal display device using the planar light source can be provided.

BRIEF DESCRIPTION OF THE DRAWINGS

FIG. 11 is a partial plan view illustrating a partitioning member 1C.

FIG. 12 is a partial plan view illustrating a partitioning member 1D.

FIG. 18 is a partial plan view illustrating the partitioning member 2 (part 2).

DETAILED DESCRIPTION

Figure 1:
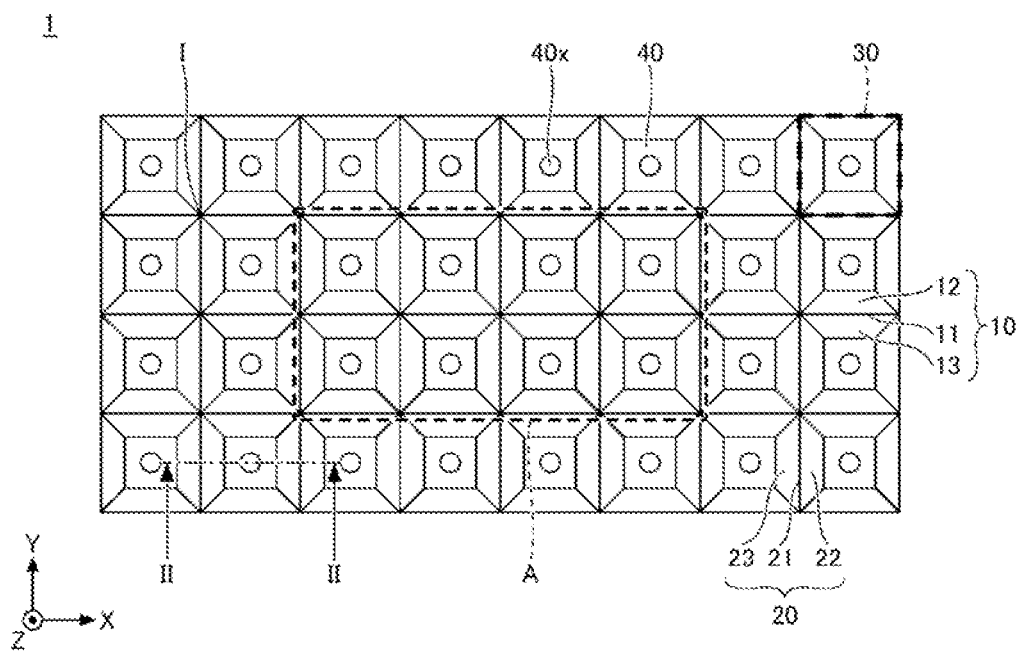
FIG. 1 is a plan view illustrating a partitioning member 1.

Certain embodiments of the present disclosure will be explained below with reference to the accompanying drawings. In the description below, terms indicating specific directions or positions (e.g., "upper," "lower," and other terms including and related to these) might be used. These terms, however, are merely used in order to make the disclosure in the drawings being referenced more easily understood, and the meanings of these terms are not intended to limit the technical scope of the present invention. The same reference numerals shown in a number of drawings designate the same or equivalent parts or members.

The embodiments described below illustrating planar light sources and the like are provided to give shape to the technical ideas of the present invention, and are not intended to limit the present invention. The sizes, shapes, and relative positions of, and materials for, the members explained in the description below are not intended to limit the scope of the present invention to only those described unless otherwise noted, and are intended for illustration purposes. Moreover, what is explained in relation to one embodiment is also applicable to other embodiments or their variations. The sizes of and relative positions of the members shown in the drawings might be exaggerated for clarity of explanation. Furthermore, for the purpose of not making the drawings excessively complex, schematic diagrams omitting certain elements might be used, or only a cut end face might be shown as a cross-sectional view.

First Embodiment

With respect to a First Embodiment, a partitioning member will be explained first, followed by the description of a planar light source having a partitioning member and light sources arranged on a substrate.

Partitioning Member 1

Figure 2:
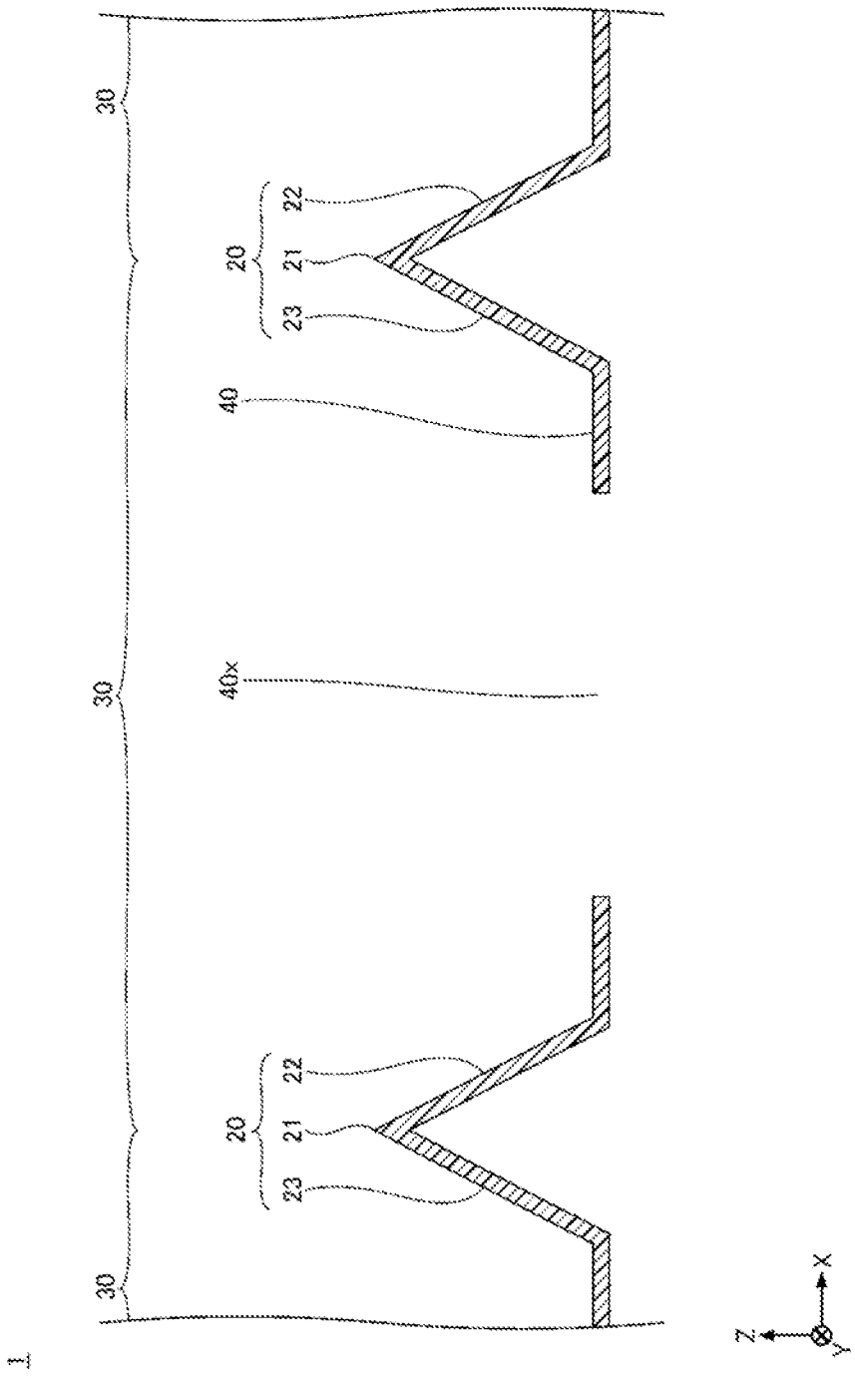
FIG. 2 is a cross-sectional view taken along line II-II in FIG. 1.

FIG. 1 is a plan view illustrating a partitioning member 1. FIG. 2 is a cross-sectional view taken along line II-II in FIG. 1.

As shown in FIG. 1 and FIG. 2, the partitioning member 1 has a plurality of first wall parts 10, a plurality of second wall parts 20, and a plurality of partitioned regions 30. The first wall parts 10 are arranged, for example, in parallel with one another. The second wall parts 20 are arranged, for example, in parallel with one another. The partitioning member 1 may have a plurality of bottom parts 40 as needed. Hereinafter, the case in which the partitioning member 1 has a plurality of bottom parts 40 will be explained as an example.

A first wall part 10 has a first ridge 11 extending in a first direction, a first lateral wall 12, and a second lateral wall 13. The first lateral wall 12 and the second lateral wall 13 are arranged to interpose the first ridge 11 in a plan view. The upper edge of the first lateral wall 12 and the upper edge of the second lateral wall 13 are continuous. There is a space between the first lateral wall 12 and the second lateral wall 13.

A first ridge 11 is a line connecting the highest positions of a first wall part 10. The first ridge 11 and around thereof in a cross section orthogonal to the first ridge 11 may have a pointed shape or a rounded shape. The first ridge 11 may be shaped as a linearly extending extremely narrow flat part. The flat part here is not wide enough for fastening with a screw, and has a narrower width than a screw hole. The width of the flat part, for example, is 1 mm at most. The first ridge 11 does not have any portion that is wide enough to be used for screw fastening, and practically has a constant width.

A second wall part 20 has a second ridge 21 extending in a second direction intersecting the first direction, a third lateral wall 22, and a fourth lateral wall 23. The third lateral wall 22 and the fourth lateral wall 23 are arranged to interpose the second ridge 21 in a plan view. The upper edge of the third lateral wall 22 and the upper edge of the fourth lateral wall 23 are continuous. There is a space between the third lateral wall 22 and the fourth lateral wall 23.

A second ridge 21 is a line connecting the highest positions of a second wall part 20. The second ridge 21 and around thereof in a cross section orthogonal to the second ridge 21 may have a pointed shape or a rounded shape. The second ridge 21 may be shaped as a linearly extending extremely narrow flat part. The flat part here is not wide enough for fastening with a screw, and has a narrower width than a screw hole. The width of the flat part, for example, is 1 mm at most. The second ridge 21 does not have any portion that is wide enough to be used for screw fastening, and practically has a constant width.

In FIG. 1, the X direction and the Y direction orthogonal to one another are designated, and the direction orthogonal to both the X and Y directions is designated as the Z direction. In the partitioning member 1, either of the directions in which the two ridges extend can be used as a first direction. Here, of the X and Y directions orthogonal to one another in FIG. 1, the X direction will be used as the first direction X, and the Y direction will be used as the second direction Y in the description below. The first direction and the second direction do not have to be orthogonal to one another in the partitioning member 1. In the description below, the −X direction of a subject might occasionally be referred to as the X− side, the +X direction as the X+ side, the −Y direction as the Y− side, and the +Y direction as the Y+ side.

A partitioned region 30 is a region that is surrounded by first ridges 11 and second ridges 21 in a plan view. Partitioned regions 30 are arranged in the first direction and the second direction. In the example shown in FIG. 1, the partitioned regions are arranged in rows and columns, using the first direction X as the row direction and the second direction Y as the column direction. The number of the partitioned regions 30 arranged in the rows may be the same or different. The number of the partitioned regions 30 arranged in the columns may be the same or different. In the example shown in FIG. 1, the partitioned regions having a quadrangular plan view shape are arranged in four rows and eight columns.

The partitioned region 30 includes two facing first wall parts 10 (an opposing pair of the first wall parts 10), two facing second wall parts 20 (an opposing pair of the second wall parts 20), and a bottom part 40. The bottom part 40 has, for example, a quadrangular shape in a plan view. In the partitioned region 30, two facing first wall parts 10 are the first lateral wall 12 positioned at the Y− side outer edge of the bottom part 40, and the second lateral wall 13 positioned at the Y+ side outer edge of the bottom part 40. In the partitioned region 30, two facing second wall parts 20 are the third lateral wall 22 positioned at the X− side outer edge of the bottom part 40 and the fourth lateral wall 23 positioned at the X+ side outer edge of the bottom part 40.

The outer edges of the bottom part 40 are connected to the lower edges of the first lateral wall 12, the second lateral wall 13, the third lateral wall 22, and the fourth lateral wall 23. In other words, the first lateral wall 12, the second lateral wall 13, the third lateral wall 22, and the fourth lateral wall 23 are arranged to form a frame that surrounds the bottom part 40 in a plan view. The first lateral wall 12, the second lateral wall 13, the third lateral wall 22, and the fourth lateral wall 23 are oblique to the bottom part 40. In the partitioned region 30, the distance between the facing first lateral wall 12 and second lateral wall 13 in the second direction Y becomes smaller towards the bottom part 40 and larger towards the top. In the partitioned region 30, the distance between the facing third lateral wall 22 and fourth lateral wall 23 in the first direction X becomes smaller towards the bottom part 40 and larger towards the top.

The bottom part 40 has an opening 40x. In the case of employing the partitioning member 1 in a planar light source, the opening 40x can be used to dispose a light source. The opening 40x, for example, is located in the central portion of the bottom part 40, and does not reach the lower edges of the first lateral wall 12, the second lateral wall 13, the third lateral wall 22, and the fourth lateral wall 23. In a plan view, the area of the opening 40x is smaller than the area of the bottom part 40. The opening 40x, for example, has a circular shape in a plan view.

In a longitudinal sectional view, cutting a bottom part 40 in parallel with the second direction Y through the central portion of the bottom part, the first wall part 10 that includes a first ridge 11, a first lateral wall 12, and a second lateral wall 13 preferably has an inverted V shape that opens downward. In a longitudinal sectional view, cutting a bottom part 40 in parallel with the first direction X through the center of the bottom part 40 (for example, FIG. 2), the second wall part 20 that includes a second ridge 21, a third lateral wall 22, and a fourth lateral wall 23 preferably has an inverted V shape that opens downward.

The first wall parts 10 located along the Y− side peripheral edge of the entire partitioning member 1 do not need to have a second lateral wall 13. In this case, the first ridges 11 located along the Y− side peripheral edge of the entire partitioning member 1 are the upper edges of the first lateral walls 12. The second wall parts 20 located along the Y− side peripheral edge of the entire partitioning member 1 may be provided with a second cut 52 or not. The first wall parts 10 located along the Y+ side peripheral edge of the entire partitioning member 1 do not need to have a first lateral wall 12. In this case, the first ridges 11 located along the Y+ side peripheral edge of the entire partitioning member 1 are the upper edges of the second lateral walls 13. The second wall parts 20 located along the Y+ side peripheral edge of the entire partitioning member 1 may be provided with a second cut 52 or not.

The second wall parts 20 located along the X− side peripheral edge of the entire partitioning member 1 do not need to have a fourth lateral wall 23. In this case, the second ridges 21 located along the X− side peripheral edge of the entire partitioning member 1 are the upper edges of the third lateral walls 22. The first wall parts 10 located along the X− side peripheral edge of the entire partitioning member 1 may be provided with a first cut 51 or not. The second wall parts 20 located along the X+ side peripheral edge of the entire partitioning member 1 do not need to have a third lateral wall 22. In this case, the second ridges 21 located along the X+ side peripheral edge of the entire partitioning member 1 are the upper edges of the fourth lateral walls 23. The first wall parts 10 located along the X+ side peripheral edge of the entire partitioning member 1 may be provided with a first cut 51 or not.

Figure 3:
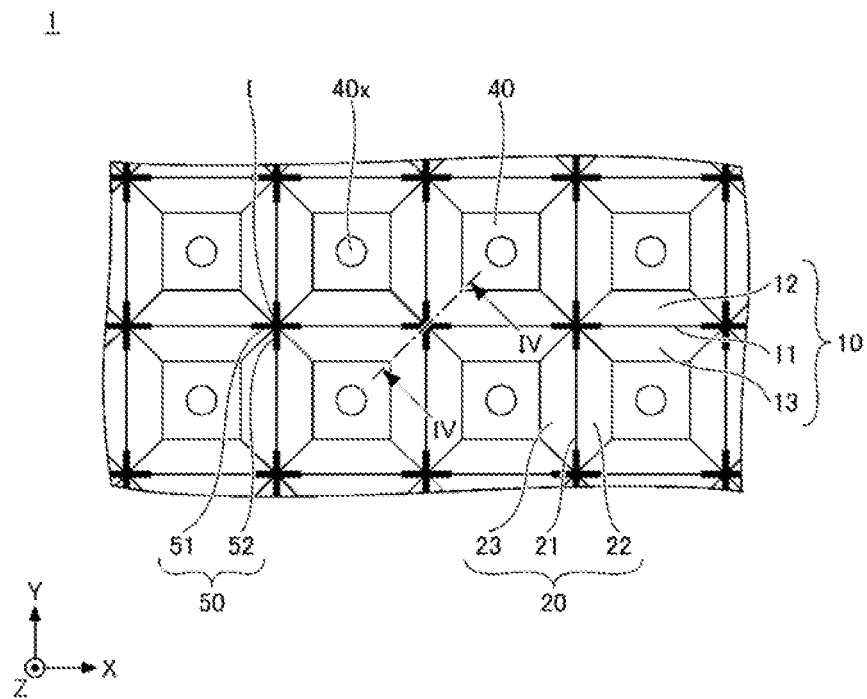
FIG. 3 is a partial plan view showing the region A in FIG. 1.

FIG. 3 is a partial plan view showing the region A in FIG. 1. The partitioning member 1 has first cuts 51 created on the first ridges 11 and second cuts 52 created on the second ridges 21. In FIG. 3, continuous cuts 50 in which a first cut 51 and a second cut 52 are continuously formed at each location are illustrated. With respect to the partitioning member 1 and the partitioning member 1A described later, the first cuts 51 and the second cuts 52 might occasionally be described in terms of continuous cuts 50. The first cuts 51 have a straight line shape that extends, for example, in the first direction X, and the second cuts 52 have a straight line shape that extends, for example, in the second direction Y. The lengths of the first cuts 51 and the second cuts 42 may be the same or different.

Figure 4:
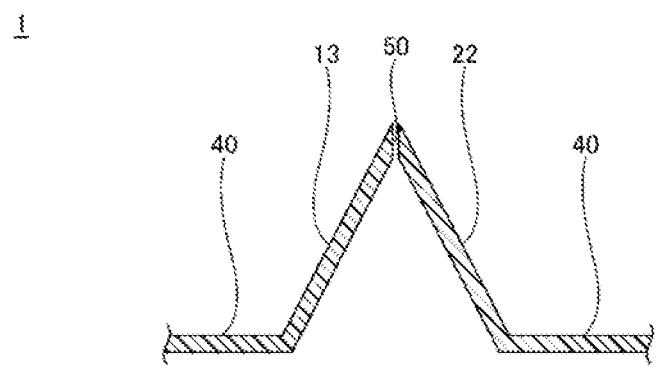
FIG. 4 is a cross-sectional view taken along line IV-IV in FIG. 3.
Figure 5:
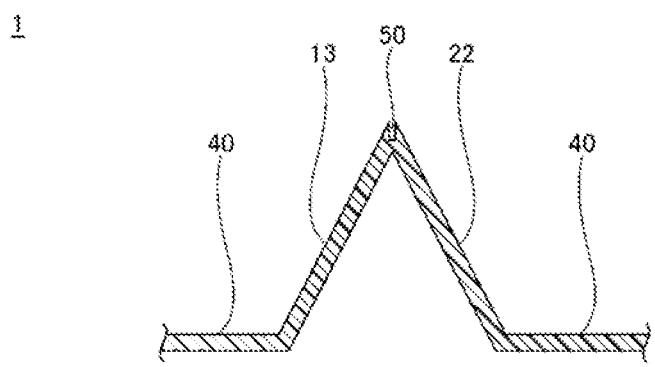
FIG. 5 is a cross-sectional view of another example of a continuous cut (1).
Figure 6:
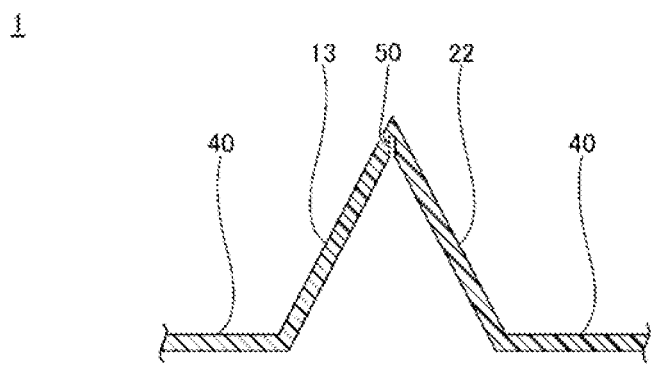
FIG. 6 is a cross-sectional view of another example of a continuous cut (2).

FIG. 4 is a cross-sectional view taken along line IV-IV in FIG. 3. As shown in FIG. 4, a continuous cut 50 may extend through a first wall part 10 or second wall part 20. FIG. 5 is a cross-sectional view illustrating another example of a continuous cut (1). FIG. 6 is a cross-sectional view illustrating another example of a continuous cut (2). FIG. 5 and FIG. 6 each show a cross section that corresponds to the cross section shown in FIG. 4. As shown in FIG. 5 and FIG. 6, a continuous cut 50 does not have to extend through a first wall part 10 or a second wall part 20.

In other words, a first cut 51 may extend through a first wall part 10 or not. For example, a first cut 51 may be a recessed portion having a bottom. In the case in which a first cut 51 does not extend through a first wall part 10, the depth of the first cut 51 is preferably at least one half of the thickness of the first wall part 10. In the case in which a first cut 51 does not extend through a first wall part 10, the first cut 51 may be created on the first ridge 11 or in the lower face of the first wall part 10 positioned directly under the first ridge 11. In the case of using the partitioning member 1 in the planar light source described later, positioning the first cuts 51 in the lower faces of the first wall parts 10 can reduce the occurrence of an optical impact, such as luminance non-uniformity.

A second cut 52 may extend through a second wall part 20 or not. For example, a second cut 52 may be a recessed portion having a bottom. In the case in which a second cut 52 does not extend through a second wall part 20, the depth of the second cut 52 is preferably at least one half of the thickness of the second wall part 20. In the case in which a second cut 52 does not extend through a second wall part 20, the second cut 52 may be created on the second ridge 21 or in the lower face of the second wall part 20 positioned directly under the second ridge 21. In the case of using the partitioning member 1 in the planar light source described later, positioning the second cuts 52 in the lower faces of the second wall parts 20 can reduce the occurrence of an optical impact such as luminance non-uniformity.

In a plan view, a continuous cut 50 is cross-shaped. For example, a first cut 51 passes the midpoint of a second cut 52, and the second cut 52 passes the midpoint of the first cut 51. In a continuous cut 50, the intersection between the first cut 51 and the second cut 52 coincides with an intersection I. It suffices to provide at least one continuous cut 50. In the example shown in FIG. 3, a continuous cut 50 is provided at each intersection I. The shape of a continuous cut 50 in a plan view is not limited to a cross shape, i.e., it can be L-shaped, I-shaped, T-shaped, or the like.

The first cut 51 and the second cut 52 at one intersection I are positioned apart from any other intersection I adjacent to that intersection I. In the case in which a continuous cut 50 is provided at an adjacent intersection I, the adjacent continuous cuts 50 are spaced apart, not contacting one another. The length of each of the first cut 51 and the second cut that make up a continuous cut 50 is, for example, shorter than the length of a side of a partitioned region 30. The length of each of the first cut 51 and the second cut can be set, for example, as one third of the length of a side of a partitioned region 30.

In FIG. 3, the continuous cuts 50 are exaggerated by using bold lines in order to clearly show the locations of the continuous cuts 50. In reality, however, the first cuts 51 and the second cuts 52 that make up the continuous cuts 50 are formed to have a width of about a few hundred microns, for example, by using a method in which a partitioning member intermediate body which has no first cuts 51 or second cuts 52 on the first ridges 11 or the second ridges 21 is prepared and cuts are made using an edge tool such as a cutter.

The partitioning member 1 may alternatively be formed by injection molding or the like. In the case of forming the partitioning member by injection molding or the like, a die is placed on the portions corresponding to the first cuts 51 and the second cuts 52 such that the molding material is excluded from the portions corresponding to the first cuts 51 and the second cuts 52. As such, cuts include even those formed by a method not involving a cutting process.

The first cuts 51 and the second cuts 52 may be formed, for example, by preparing a partitioning member intermediate body which has no first cuts 51 or second cuts 52 on the first ridges 11 or the second ridges 21, followed by punching using a die. Specifically, the first cuts 51 and the second cuts 52 can be formed in the partitioning member intermediate body by placing a die on the lower face of the partitioning member intermediate body, and pressing the partitioning member intermediate body via a backing plate from the upper face side. This method is preferable from the standpoint of not generating burrs during the formation of the first cuts 51 and the second cuts 52. In this case, the first cuts 51 and the second cuts 52 may be created across the entire partitioning member intermediate body in one punching motion or several punching motions. They may be created by punching per location.

A first lateral wall 12 and a second lateral wall 13 interposing a first cut 51 might be in contact at least in part. A third lateral wall 22 and a fourth lateral wall 23 interposing a second cut 52 might be in contact at least in part. In the case in which the partitioning member 1 has light reflectivity and is employed in the planar light source described later, allowing the first cuts 51 and/or second cuts 52 to be closed at least partially in this manner can deter the light from the light sources from directly entering the first cuts 51 or the second cuts 52 or deter the light returning from an optical sheet or the like from advancing into the first cuts 51 and/or the second cuts 52. This can reduce the decline in the amount of the light extracted from the planar light source.

The partitioning member 1 can be placed on a substrate and bonded to the substrate to construct a planar light source. In the case in which the partitioning member 1 has light reflectivity, the first lateral walls 12 and the second lateral walls 13 of the first wall parts 10, the third lateral walls 22 and the fourth lateral walls 23 of the second wall parts 20, and the bottom parts 40 function as reflective members that reflect the light from the light sources. In other words, the partitioning member 1 can be used as a reflector for a planar light source.

"Placed on a substrate" includes both directly placing a partitioning member or the like on the upper face of a substrate and indirectly placing while interposing the cover member described later or the like. "Bonded to a substrate" includes both directly bonding a partitioning member or the like to the upper face of a substrate and indirectly bonding to a substrate while interposing the cover member described later or the like.

In the case of a planar light source in which a partitioning member 1 is placed on a substrate and light sources are individually disposed on the substrate exposed at the openings 40x, the partitioning member 1 might shrink when subjected to a thermal load, such as during storage under high temperature conditions or when driving the light sources. The partitioning member 1 when stored by itself under high temperature conditions might undergo thermal shrinkage.

Figure 7:
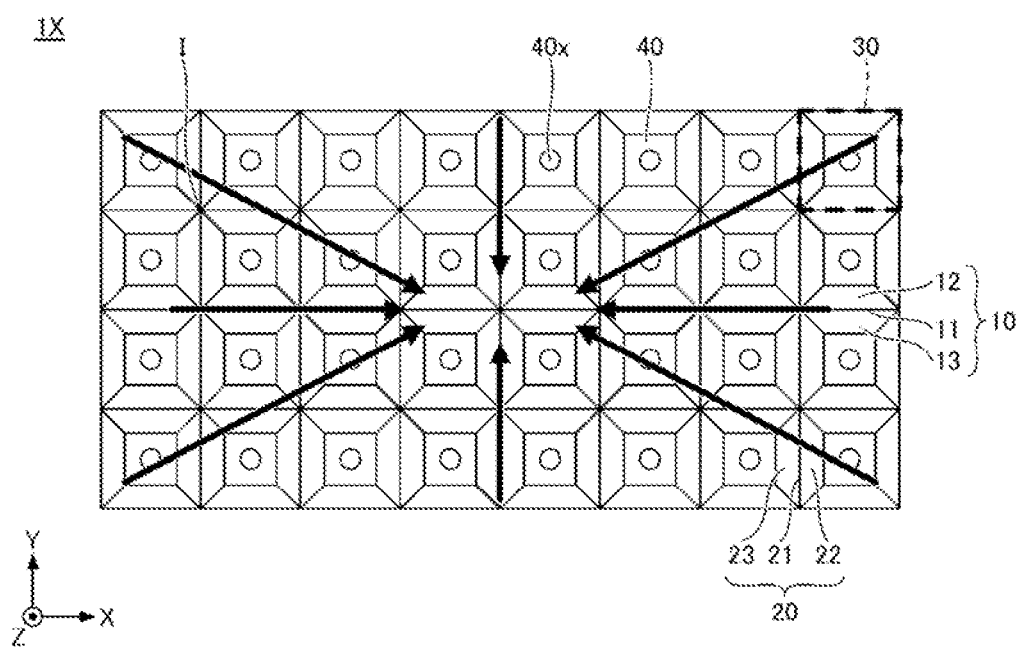
FIG. 7 is a diagram explaining shrinkage attributable to a thermal load in a partitioning member 1X which is a comparative example.

For example, assuming that no cuts are formed in the partitioning member 1X shown in FIG. 7 which is a comparative example, the partitioning member 1X would attempt to shrink towards the center as indicated by the arrows when a thermal load is applied to the partitioning member 1X. The larger the size of the partitioning member 1X in a plan view, the greater the degree of shrinkage of the partitioning member 1X results. If the partitioning member 1X shrinks due to a thermal load, the distances from the light source to the first lateral wall 12, the second lateral wall 13, the third lateral wall 22, and the fourth lateral wall 23 in the partitioned region 30 might change.

Figure 8:
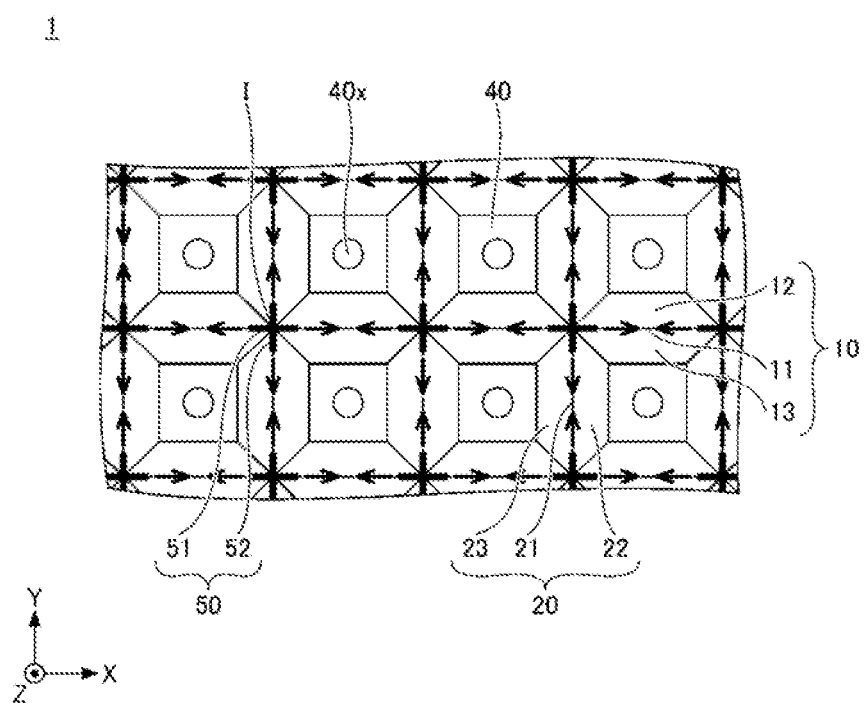
FIG. 8 is a diagram explaining reduction of shrinkage attributable to a thermal load in a partitioning member 1.

In contrast, in the partitioning member 1 provided with continuous cuts 50, the first ridges 11 and the second ridges 21 are segmentalized by the continuous cuts 50. Accordingly, when a thermal load is applied, the partitioning member 1 is allowed to shrink per first ridge 11 and per second ridge 21 segmentalized by the continuous cuts 50. When the partitioning member is allowed to shrink per first ridge 11 and per second ridge 21, the first ridges 11 and the second ridges 21 shrink in its own shrinking direction (the directions indicated by the arrows in FIG. 8), thereby inhibiting the partitioning member 1 from shrinking towards the center like that shown in FIG. 7. This can reduce the changes in the distances from the light source to the first lateral wall 12, the second lateral wall 13, the third lateral wall 22, and the fourth lateral wall 23 in each partitioned region 30. As a result, changes in the light reflecting directions in the partitioning member 1 can be reduced. This can reduce luminance non-uniformity or chromaticity non-uniformity in the planar light source.

The partitioning member 1 can be formed into the shape having first wall parts 10, second wall parts 20, and bottom parts 40, for example, by using a die and pressing a sheet of polyethylene terephthalate (PET) or the like of about 0.2 to about 0.3 mm in thickness. Because the areas corresponding to the intersections I are stretched most during forming, the thermal stress would reach maximum at the intersections I. Accordingly, easing the stress by creating continuous cuts 50 at the intersections I is particularly effective in reducing the shrinkage of the partitioning member 1 attributable to a thermal load. Furthermore, a cross-shaped continuous cut 50 is effective in deterring the partitioning member 1 from shrinking in both the first direction X and the second direction Y. Providing continuous cuts 50 at all intersections I of the partitioning member 1 is effective in reducing the shrinkage of the partitioning member 1 as a whole.

Providing the first cuts 51 and/or the second cuts at the intersections I have the benefits described below as compared to providing them elsewhere. When the partitioned regions 30 are quadrangular, the intersections I are more distant from the light sources than any other location. Accordingly, in the case of using the partitioning member in a planar light source, providing the first cuts 52 and/or the second cuts 52 at the positions more distant from the light sources can arrow the light from the light sources to less likely hit the first cuts 51 and/or the second cuts 52, thereby reducing the optical impact such as luminance non-uniformity.

Furthermore, in the partitioning member 1, the partitioned regions 30 is quadrangular and has the same shape in a plan view. This can deter the occurrence of an optical impact such as luminance non-uniformity.

Partitioning Member 1A

Figure 9:
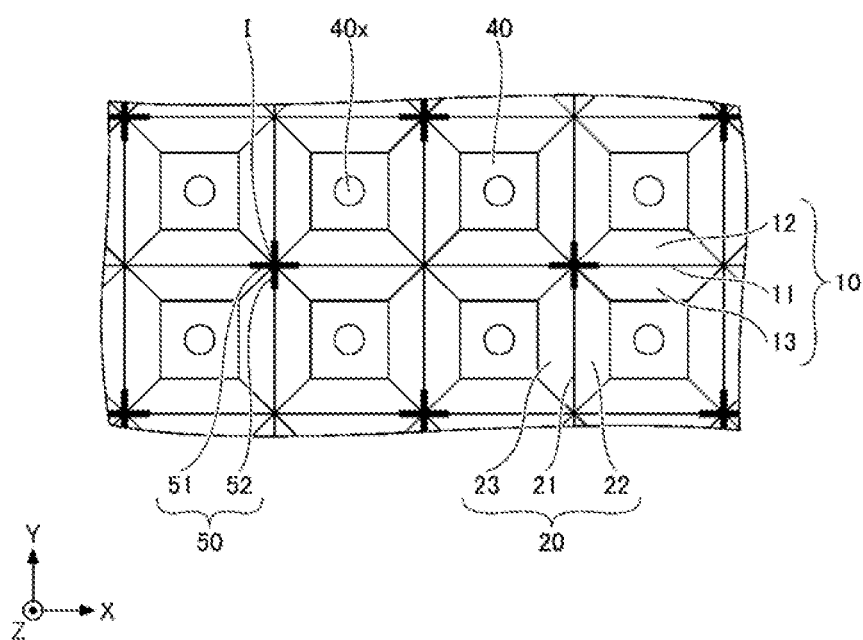
FIG. 9 is a partial plan view illustrating a partitioning member 1A.

A partitioning member 1A is another example of a partitioning member. FIG. 9 is a partial plan view illustrating the partitioning member 1A. The partitioning member 1A differs from the partitioning member 1 (see FIG. 3) such that the continuous cuts 50 are provided to form a zigzag pattern.

Here, a zigzag pattern refers to a pattern in which there is an intersection I without a continuous cut 50 between two adjacent continuous cuts 50 in the first direction X and an intersection I without a continuous cut 50 between two adjacent continuous cuts 50 in the second direction Y. In other words, in the partitioning member 1A, continuous cuts 50 are arranged so as to interpose an intersection I with a continuous cut in the first direction X. Moreover, continuous cuts 50 are arranged so as to interpose an intersection I with a continuous cut in the second direction Y. The intersections I that are adjacent to an intersection I with a continuous cut 50 in the first direction X and the second direction Y have no continuous cut 50.

Similar to the partitioning member 1, the partitioning member 1A can be used as a reflector for a planar light source. The partitioning member 1A having continuous cuts 50 can achieve a similar effect to that achieved by the partitioning member 1.

Partitioning Member 1B

Figure 10:
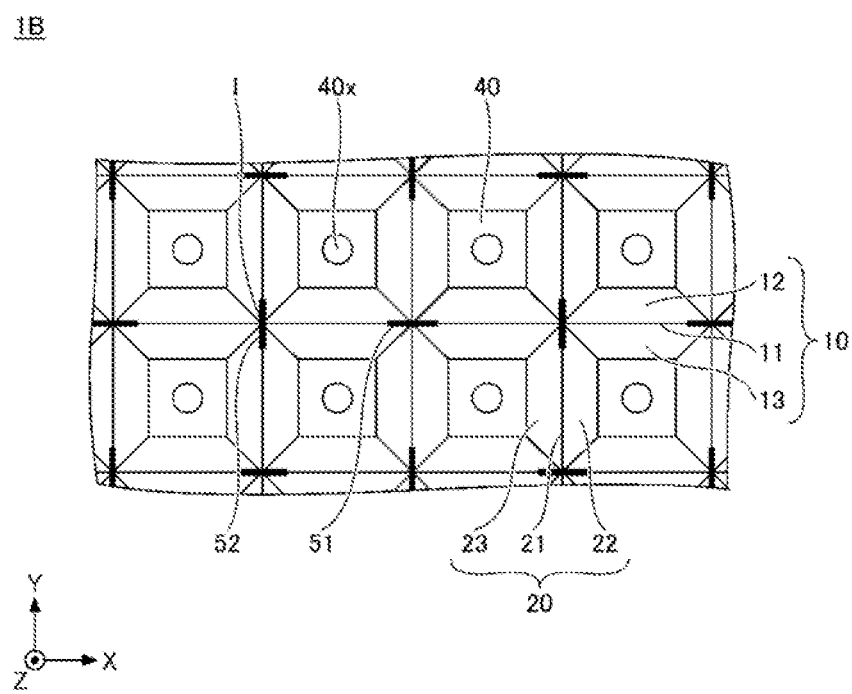
FIG. 10 is a partial plan view illustrating a partitioning member 1B.

A partitioning member 1B is another example of a partitioning member. FIG. 10 is a partial plan view illustrating the partitioning member 1B. The partitioning member 1B differs from the partitioning member 1 (see FIG. 3) such that, unlike continuous cuts 50, the first cuts 51 and the second cuts 52 are not continuous and are provided apart from one another.

In the partitioning member 1B, the first cuts 51 and the second cuts 52 are alternately positioned at the intersections I on the first ridges 11 intersected by the second ridges 21. The first cuts 51 and the second cuts 52 are alternately positioned at the intersections I on the second ridges 21 intersected by the first ridges 11. The first cuts 51 and the second cuts 52 may be alternately positioned at the intersections 1 only on the first ridges 11 intersected by the second ridges 21 or on the second ridges 21 intersected by the first ridges 11.

The first cut 51 positioned at an intersection I is spaced apart from any other intersections I adjacent to that intersection I. In other words, the first cut 51 positioned at an intersection I does not reach any other intersections I adjacent to that intersection I. The same applies to the second cuts 52.

Similar to the partitioning member 1, the partitioning member 1B can be used as a reflector for a planar light source. The partitioning member 1B provided with first cuts 51 and second cuts 52 can achieve a similar shrinkage reduction effect to that achieved by the partitioning member 1. Furthermore, in contrast to a continuous cut 50 in which the degree of opening in the area near the intersection of the first cut 51 and the second cut 52 is relatively large, the degree of opening can be reduced at the cut in the case of spacing and alternating the first cuts 51 and the second cuts 52. Accordingly, employing the partitioning member 1B in a planar light source can reduce the advancement of the light from the light sources and the light returning from the optical sheet or the like into the first cuts 51 and the second cuts 52, thereby reducing the decline in the amount of the light extracted from the planar light source.

Other Variations of Partitioning Member

In a partitioning member, first cuts 51 and second cuts 52 may be arranged between adjacent intersections I instead of positioning the cuts at the intersections I so as not to come into contact with the intersections I. In this case, only the first cuts 51 may be arranged, only the second cuts 52 may be arranged, or both the first cuts 51 and the second cuts 52 may be arranged. The first cuts 51 and the second cuts 52 may be composed of an arrangement of dots.

Furthermore, in a partitioning member, the plan view shape of the partitioned region is not limited to a quadrangle. For example, the plan view shape of the partitioned region 30 may be hexagonal as in the case of the partitioning member 1C shown in FIG. 11 and the partitioning member 1D shown in FIG. 12.

The partitioning members 1C and 1D have a plurality of third wall parts 70 in addition to first wall parts 10 and second wall parts 20. The third wall parts 70 are arranged, for example, in parallel with one another. The partitioning members 1C and 1D may have a plurality of bottom parts 40 as needed.

A third wall part 70 has a third ridge 71, a fifth lateral wall 72, and a sixth lateral wall 73, each extending in a third direction that is different from the first and second directions. The fifth lateral wall 72 and the sixth lateral wall 73 are positioned to interpose the third ridge 71 in a plan view. The upper edge of the fifth lateral wall 72 and the upper edge of the sixth lateral wall 73 are continuous. There is a space between the fifth lateral wall 72 and the sixth lateral wall 73.

A third ridge 71 is a line connecting the highest positions of a third wall part 70. The third ridge 71 in a cross section cut in the direction orthogonal to the third ridge 71 may have a pointed shape or rounded shape. The third ridge 71, as explained with reference to the first ridges 11, may be shaped as a linearly extending extremely narrow flat part.

The partitioning members 1C and 1D have first cuts 51 on the first ridges 11, second cuts 52 on the second ridges 21, and third cuts 53 on the third ridges 71. A first cut 51, a second cut 52, and a third cut 53 are continuous to make up a continuous cut 50C. In a continuous cut 50C, a first cut 51, a second cut 52, and a third cut 53 become continuous at the intersection I of a first ridge 11, a second ridge 21, and a third ridge 71. In the partitioning member 1C, a continuous cut 50C is provided at each intersection I. In contrast, in the partitioning member 1D, the continuous cuts 50C are provided to form a zigzag pattern.

As such, the partitioning members 1C and 1D have a plurality of first wall parts 10 having a first ridge 11, a plurality of second wall parts 20 having a second ridge 21, and a plurality of third wall parts 70 having a third ridge 71 extending in a different direction from those of the first ridges 11 and the second ridges 21. Two first ridges 11, two second ridges 21, and two third ridges 71 are linked at their ends to define a partitioned region 30. For example, when a plan view shape of the partitioned region 30 is a hexagon, the partitioned regions 30 are arranged in a honeycomb pattern in a plan view. A partitioned region 30 may be a regular hexagon in a plan view.

Figure 13:
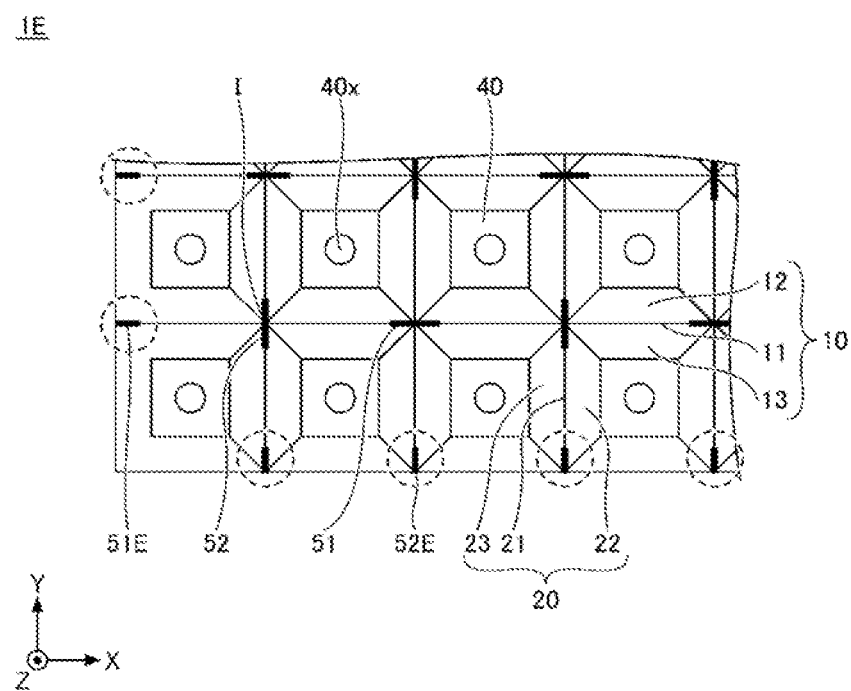
FIG. 13 is a partial plan view illustrating a partitioning member 1E.

FIG. 13 is a partial plan view of a partitioning member 1E, showing a lower left corner portion of the partitioning member 1E. As shown in the portions encircled by broken lines in FIG. 13, peripheral first cuts 51E and peripheral second cuts 52E that are different from the first cuts 51 and the second cuts 52 may be provided along the perimeter of the partitioning member 1E. The peripheral first cuts 51E are created on the first ridges 11 and positioned along the outline of the partitioning member 1E. The peripheral second cuts 52E are created on the second ridges 21 and positioned along the outline of the partitioning member 1E. The peripheral first cuts 51E and the peripheral second cuts 52E can each be formed to be orthogonal to the outline of the partitioning member 1E.

In the partitioning member 1E, as an example, the first cuts 51 and the second cuts 52 are alternately formed on the first ridges 11 at the intersections I intersected by the second ridges 21. Also, as an example, the first cuts 51 and the second cuts 52 are alternately provided on the second ridges 21 at the intersections I intersected by the first ridges 11. The peripheral first cuts 51E and the peripheral second cuts 52E may be provided by following these regularities, or not. In the example shown in FIG. 13, all of the peripheral first cuts 51E and the peripheral second cuts 52E are orthogonal to the outline. The lengths of the peripheral first cuts 51E and the peripheral second cuts 52E, in the example shown in FIG. 13, are shorter than the length of the first cuts 51 and the second cuts 52. The lengths of the peripheral first cuts 51E and the peripheral second cuts 52E can be about one half of the lengths of the first cuts 51 and the second cuts 52. The peripheral first cuts 51E and the peripheral second cuts 52E can be formed simultaneously with the first cuts 51 and the second cuts 52, or in a separate step from that for forming the first cuts 51 and the second cuts 52. The production efficiency can be improved by simultaneously forming the peripheral first cuts 51E, the peripheral second cuts 52E, the first cuts 51, and the second cuts 52.

Figure 14:
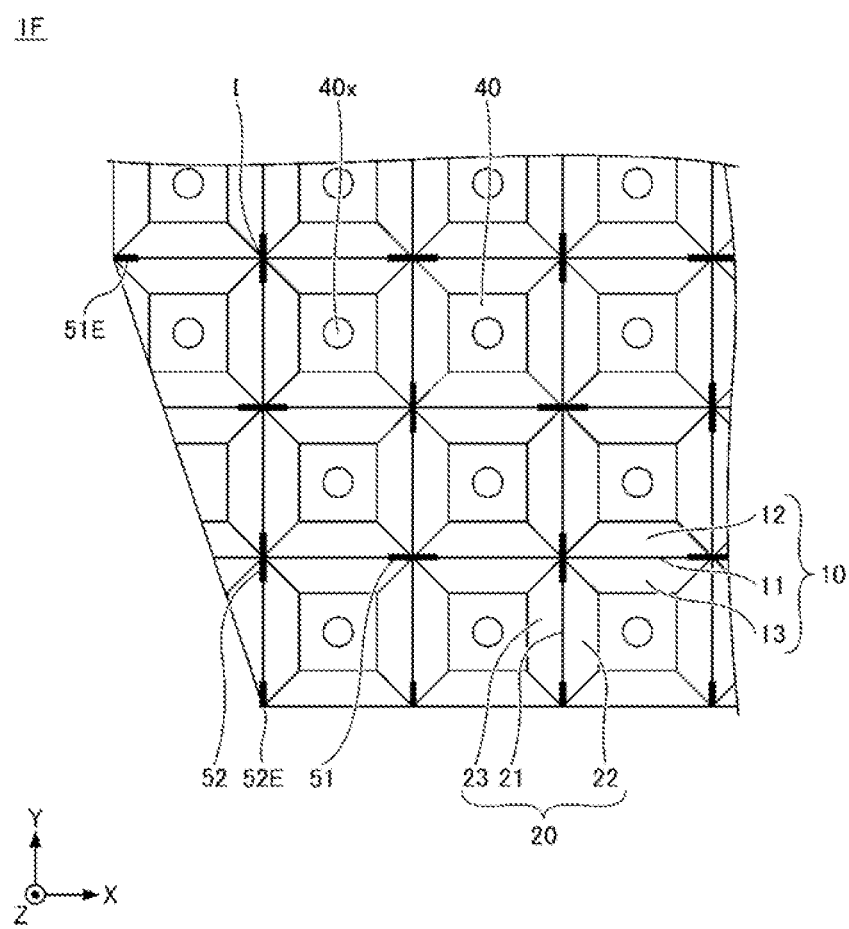
FIG. 14 is a partial plan view illustrating a partitioning member 1F.

A partitioning member may have a quadrangular shape in a plan view as shown in FIG. 1, or an irregular shape (a shape other than a quadrangular shape) in a plan view. FIG. 14 is a partial plan view illustrating a partitioning member 1F having an irregular shape in a plan view, showing the lower left corner portion of the partitioning member 1F. Here, an irregular shape refers to a shape other than a quadrangular shape in a plan view, for example, a shape adapted for a specific product shape by making a partial or overall modification to a complete quadrangular shape. The outline of the partitioning member may consist only of straight lines as in the case of the example shown in FIG. 14, or include a curved line. In the partitioning member 1F, there is a region at the lower left corner in which no partitioned region is provided.

In the partitioning member 1F, as an example, the first cuts 51 and the second cuts 52 are alternately provided on the first ridges 11 at the intersections I intersected by the second ridges 21. Also as an example, the first cuts 51 and the second cuts 52 are alternately provided on the second ridges 21 at the intersections I intersected by the first ridges 11. Similar to the partitioning member 1E, the peripheral first cuts 51E and the peripheral second cuts 52E may be provided by following these regularities or not. In the example shown in FIG. 14, all of the peripheral first cuts 51E and the peripheral second cuts 52E are orthogonal to the outline.

Continuous cuts that pass the intersections of first ridges 11 and second ridges 21 in a partitioning member may be formed along the first ridges 11 and the second ridges 21, or not. In the case in which continuous cuts are not disposed along the first ridges 11 and the second ridges 21, the first cuts 51 and the second cuts 52 of the continuous cuts are formed on lateral walls.

In the case in which a first cut 51 is positioned at the intersection of a first ridge 11 and a second ridges 21, the first cut 51 can extend from the position on the line extending the lower edge of a third lateral wall 22 in parallel with the Y direction to the position on the line extending the lower edge of a fourth lateral wall 23 in parallel with the Y direction in a plan view. Similarly, in the case in which a second cut 52 is positioned at the intersection of a first ridge 11 and a second ridges 21, the second cut 52 can extend from the position on the line extending the lower edge of the first lateral wall 12 in parallel with the X direction to the position on the line extending the lower edge of the second lateral wall 13 in parallel with the X direction in a plan view.

Furthermore, in the case of providing multiple first cuts 51 on first ridges 11, the lengths of the first cuts 51 may be the same, or the lengths may increase as the positions of the first cuts 51 become closer to the perimeter of the partitioning member. Because the degree of shrinkage is greater near the perimeter of the partitioning member, increasing the lengths of the first cuts 51 as their positions become closer to the perimeter can reduce the shrinkage occurring near the perimeter. The same applies in the case of providing multiple second cuts 52 on the second ridges 21. In other words, in the case of providing multiple second cuts 52 on the second ridges 21, the lengths of the second cuts 52 may be the same, or the lengths may increase as the positions of the second cuts 52 become closer to the perimeter. In the case of providing multiple first cuts on the first ridges 11 and multiple second cuts 52 on the second ridges 21, the lengths of the first cuts 51 and the second cuts 52 may increase as their positions become closer to the corners of the partitioning member. This can reduce the shrinkage occurring near the perimeter.

In a partitioning member, it suffices to provide at least one first cut on at least one first ridge, and a second cut does not have to be formed on any second ridge. In a partitioning member, at least one first cut may be formed on at least one first ridge, and at least one second cut on at least one second ridge.

Planar Light Source 60

Any of the partitioning members described above can be placed on a substrate and bonded to the substrate to construct a planar light source. Here, a planar light source will be explained by using the partitioning member 1 as an example, but any other partitioning member, such as the partitioning member 1A and the partitioning member 1B, described above may be used in place of the partitioning member 1. Moreover, multiple partitioning members may be arranged on a substrate.

Figure 15:
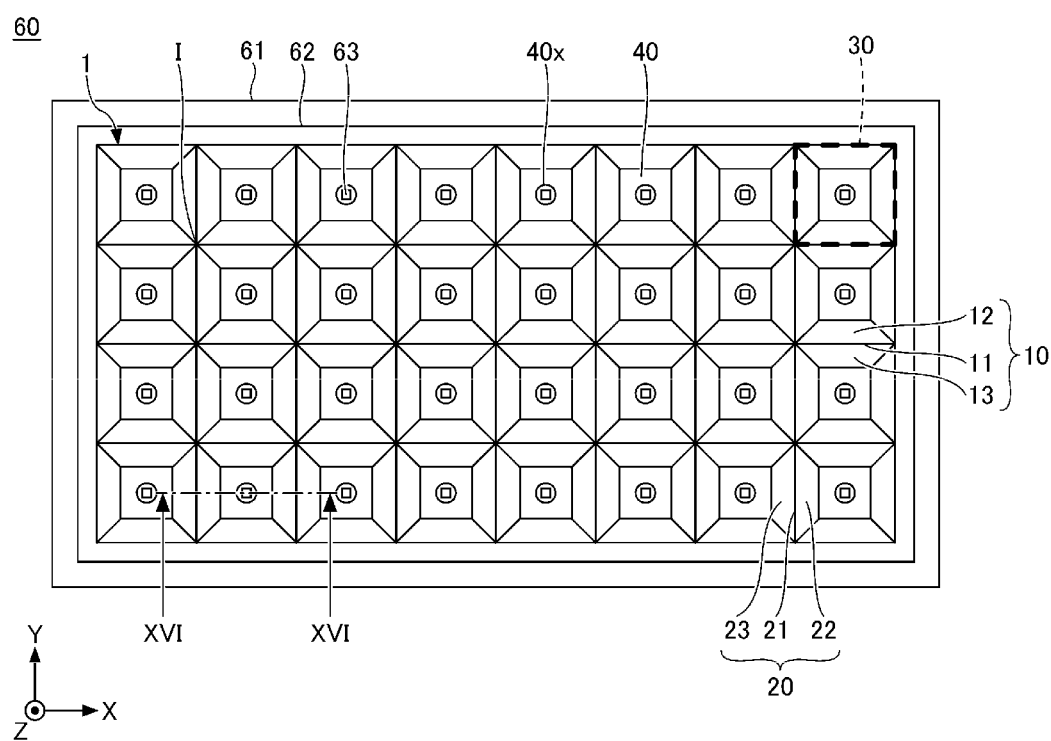
FIG. 15 is a plan view of a planar light source according to a First Embodiment.
Figure 16:
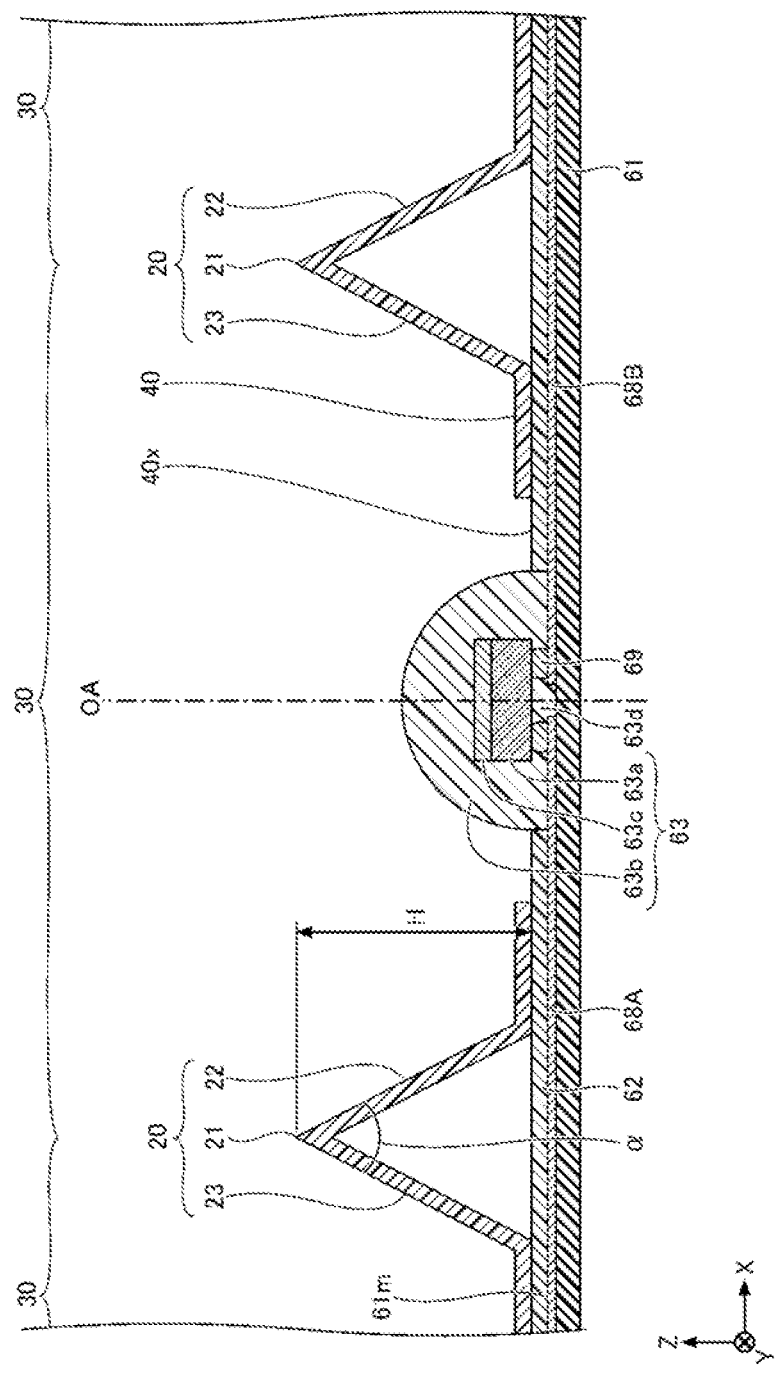
FIG. 16 is a cross-sectional view taken along line XVI-XVI in FIG. 15.

FIG. 15 is a plan view illustrating a planar light source according to the First Embodiment. FIG. 16 is a cross-sectional view taken along line XVI-XVI in FIG. 15. As shown in FIG. 15 and FIG. 16, the planar light source 60 is a surface emitting type light emitting device including a substrate 61, a cover member 62, a partitioning member 1, and a plurality of light sources 63. The partitioning member 1 is disposed on the substrate 61. The cover member 62 covers the upper face of the substrate 61 at least in part. The cover member 62 is disposed as needed.

In the planar light source 60, the lower faces of the bottom parts 40 of the partitioning member 1 are bonded to the cover member 62 disposed on the substrate 61. In other words, the lower faces of the bottom parts 40 of the partitioning member 1 are indirectly bonded to the substrate 61 via the cover member 62. In the planar light source 60, the light sources 63 are disposed on the substrate 61 exposed in the openings 40X of the bottom parts 40. The members of the planar light source 60 will be explained in detail below.

Substrate 61

A substrate 61 is a member for mounting a plurality of light sources 63. Conductor wirings 68A and 68B for supplying power to the light sources 63 are disposed on the upper face 61m of the substrate 61. A cover member 62 preferably covers a portion of the regions of the conductor wirings 68A and 68B where electrical connection with the light emitting elements does not take place.

A material that can isolate at least the pairs of conductor wirings 68A and 68B, such as a ceramic, resin, composite material, or the like can be used for the substrate 61. Examples of resins include phenol resins, epoxy resins, polyimide resins, BT resins, polyphthalamide (PPA), and polyethylene terephthalate (PET). Examples of composite materials include those made by mixing any of these resins with inorganic fillers, such as glass fibers, $SiO_2$, $TiO_2$, $Al_2O_3$ or the like, glass fiber reinforced resin (glass epoxy resin), and a metal substrate made by covering a metal material with an insulation layer.

The thickness of the substrate 61 can be suitably selected. The substrate 61 may be a flexible substrate manufacturable by roll-to-roll processing, or a rigid substrate. Such a rigid substrate may be a bendable thin-type rigid substrate. The material for the conductor wirings 68A and 68B is not particularly limited as long as it is a conductive material, and any material normally used as a wiring layer for circuit boards and the like can be used. A light reflecting film or the like may be disposed on the surfaces of the conductor wirings 68A and 68B.

The cover member 62 is preferably composed of an insulating material. Examples of the materials for use as the cover member 62 include those listed as the examples of materials for the substrate 61. Using any of the resins listed above containing a white or whitish light reflecting filler or a large number of air bubbles can reflect the light exiting from the light sources 63 to thereby improve the light extraction efficiency of the planar light source 60.

Light Source 63

A light source 63 is a member that emits light including, for example, a self-emitting light emitting element itself, a light emitting element encapsulated by a light transmissive resin, and a surface mount light emitting device (also known as LED) which is a packaged light emitting element. For example, the light source 63 is one in which a light emitting element 63a is covered by an encapsulating member 63b as shown in FIG. 16. The light source 63 may be one that uses a single light emitting element 63a or multiple light emitting elements. For the light emitting element, for example, one that emits blue light can be used. The light source 63 may be composed of a resin containing a light reflecting material that surrounds the lateral faces of a light emitting element and a light transmissive member that covers the upper face of the light emitting element and the upper face of the resin containing a light reflecting material. It may be composed of a light transmissive member that covers the upper face of a light emitting element and a resin containing a light reflecting material that surrounds the lateral faces of the light emitting element and the lateral faces of the light transmissive member. The light transmissive member here may contain a phosphor. Between the light emitting element and the light transmissive member, a light transmissive adhesive material may be disposed to adhere the light emitting element and the light transmissive member.

The light sources 63 preferably have wide light distribution in order to reduce luminance non-uniformity in the partitioned region 30 of the partitioning member 1. Particularly, the light source 63 preferably has batwing distribution characteristics. This can reduce the amount of the light exiting the light source 63 directly upward to broaden the light distribution. Allowing the broadly distributed light to hit the first lateral wall 12, the second lateral wall 13, the third lateral wall 22, the fourth lateral wall 23, and the bottom part 40 in the partitioned region 30 can reduce the luminance non-uniformity in the partitioned region.

Here, batwing distribution characteristics broadly refer to the light distribution characteristics defined by the emission intensity distribution in which the emission intensity is higher at an absolute value angle greater than 0 degrees assuming that the optical axis OA is 0 degrees. The optical axis OA, as shown in FIG. 16, is defined as the line that passes the center of the light source 63 and is perpendicular to the upper face 61m of the substrate 61.

Particularly, one example of the light source 63 having batwing distribution characteristics uses a light emitting element 63a having a light reflecting film 63c on the upper face thereof as shown in FIG. 16. The light reflecting film 63c provided on the upper face of the light emitting element 63a can reduce the amount of the light directly above the light emitting element 63a by reflecting most of the light exiting the light emitting element 63a upward thereby achieving batwing distribution characteristics. A lens may be separately combined to achieve batwing distribution.

The light reflecting film 63c can be a metal film, such as silver, copper, or the like, a resin containing a white filler, or a combination of these. The light reflecting film 63c may be a dielectric multilayer film (DBR) having an incident angle dependent reflectance with respect to the wavelength of the light from the light emitting element 63a. Specifically, the reflectance of the light reflecting film 63c is preferably set lower for oblique incidence than perpendicular incidence. This can moderate the luminance change directly above the light emitting element 63a, suppressing the area directly above the light emitting element 63a from becoming extremely less luminous, such as becoming a dark spot.

The light source 63, for example, has a light emitting element 63a mounted directly on the substrate 61 and having a height of 100 μm to 500 μm. The thickness of the light reflecting film 63c can be, for example, 0.1 μm to 3.0 μm. The thickness of the light source 63 even when including an encapsulating member 63b can be set as about 0.5 mm to about 2.0 mm.

The light sources 63 are preferably wired on the substrate 61 to be drivable independently from one another, and to allow for dimming control (e.g., local dimming or high dynamic range) per light source 63.

Light Emitting Element 63a

For the light emitting element 63a, a known element can be utilized. For example, for the light emitting element 63a, a light emitting diode is preferably used. For the light emitting element 63a, one that emits light of any wavelength can be selected. For a blue or green light emitting element, one using a nitride semiconductor, such as GaN, InGaN, AlGaN, AlInGaN or the like, can be employed. For a red light emitting element, GaAlAs, AlInGaP, or the like can be used. Furthermore, a semiconductor light emitting element made of other materials may be used. The composition, the emission color, the size, and the number of the light emitting elements used can be suitably selected for the purpose.

For example, the light emitting element 63a is flip-chip mounted so as to straddle the pair of positive and negative conductor wirings 68A and 68B disposed on the upper face 61m of the substrate 61 as shown in FIG. 16. The light emitting element 63a may be mounted face up instead of flip-chip mounting.

A bonding member 69 is for bonding the light emitting element 63a to a substrate or conductor wiring, for example, an insulating resin or conductive member. In the case of flip-chip mounting such as that shown in FIG. 16, a conductive member is used. Specific examples include, Au-containing alloys, Ag-containing alloys, Pd-containing alloys, In-containing alloys, Pb—Pd-containing alloys, Au—Ga-containing alloys, Au—Sn-containing alloys, Sn-containing alloys, Sn—Cu-containing alloys, Sn—Cu—Ag-containing alloys, Au—Ge-containing alloys, Au—Si-containing alloys, Al-containing alloys, Cu—In-containing alloys, metal flux mixtures, and the like.

Encapsulating Member 63b

An encapsulating member 63b covers a light emitting element 63a for the purpose of protecting the light emitting element 63a from the external environment as well as optically controlling the light exiting from the light emitting element 63a, such as achieving batwing distribution characteristics. The encapsulating member 63b is composed of a light transmissive material. For the material for the encapsulating member 63b, a light transmissive resin, such as an epoxy resin, silicone resin, or a mixture of these resins, or glass can be used. Among these, a silicone resin is preferably used, considering its light resistance and ease of forming. The encapsulating member 63b may contain a diffusing agent for diffusing the light exiting from the light emitting element 63a, a coloring agent corresponding to the emission color of the light emitting element 63a, or the like. Any diffusing agent and coloring agent known in the art can be used.

The encapsulating member 63b can be in direct contact with the substrate 61. The encapsulating member 63b is adjusted to have a viscosity to be applied by printing or using a dispenser, and then hardened by heating or light irradiation. The encapsulating member 63b has, for example, a semispherical shape, a vertically-elongated convex shape in a plan view, a flat convex shape in a plan view, a circular or elliptical shape in a plan view, or the like, but the shape is not limited to these. A vertically-elongated convex shape here is a shape in which the maximum length perpendicular to the upper face 61m of the substrate 61 is larger than the maximum length in parallel with the upper face 61m of the substrate 61 in a cross section. A flat convex shape here is a shape in which the maximum length in parallel with the upper face 61m of the substrate 61 is larger than the maximum length perpendicular to the upper face 61m of the substrate 61 in a cross section. The encapsulating member 63b may be disposed as underfill 63d between the lower face of the light emitting element 63a and the upper face 61m of the substrate 61.

Partitioning Member 1

A partitioning member 1 is disposed on the substrate 61. A space is provided between the upper face of the substrate 61 or the upper face of the cover member 62 and the lower faces of the first lateral walls 12 and the second lateral walls 13. A space is provided between the upper face of the substrate 61 or the upper face of the cover member 62 and the lower faces of the third lateral walls 22 and the fourth lateral walls 23.

In the partitioning member 1, the opening 40x is located in the central portion of the partitioned region 30. The opening 40x can be shaped and sized to entirely expose a light source 63, and the shape and the size are preferably set so as to position the outline of the opening 40x only in the vicinity of the light source 63. This allows the bottom part 40 to also reflect the light from the light source 63 in the case in which the partitioning member 1 has light reflectivity, thereby improving the light extraction efficiency. In the partitioning member 1, the openings 40x may be formed before forming the first cuts 51 and the second cuts, after forming the first cuts 51 and the second cuts 52, or at the same time the first cuts 51 and the second cuts 52 are formed.

In FIG. 16, the angle α formed by two adjacent third lateral wall 22 and fourth lateral wall 23 is preferably set as 60 to 90 degrees. Setting the angle α to fall within this range can reduce the space and the area occupied by the partitioning member 1 while lowering the height of the partitioning member 1, thereby reducing the thickness of the planar light source 60. The same applies to the angle formed by two adjacent first lateral wall 12 and second lateral wall 13.

The pitch between adjacent first ridges 11 and the pitch between adjacent second ridges 21 can be suitably adjusted in accordance with the size of the light sources used and the intended size of the planar light source. The pitch between adjacent first ridges 11 and the pitch between adjacent second ridges 21 are, for example, 1 mm to 50 mm, preferably 5 mm to 20 mm, more preferably 6 mm to 15 mm.

The height H of the partitioning member 1 itself, i.e., the distance between the lower face of the bottom part 40 to the first ridges 11 or the second ridges 21 in the Z direction, is preferably 8 mm at most, and is preferably about 1 mm to about 4 mm in the case of making a thinner planar light source.

The partitioning member 1 is preferably bonded to the substrate 61 by using an adhesive material. This can reduce the contraction of the partitioning member 1 even if it attempts to shrink when subjected to heat because the partitioning member is bonded to the substrate 61 via an adhesive material. The partitioning member 1 can be bonded by using a light reflecting adhesive material disposed around the opening 40x so as not to allow the light exiting from the light sources 63 to enter between the substrate 61 and the partitioning member 1. For example, it is more preferable to dispose a light reflecting adhesive material in the form of a ring along the outline of the opening 40x. The adhesive material may be, for example, a double-sided tape having an acrylic resin-based pressure-sensitive adhesive on both sides of a PET base material, a hot melt adhesive sheet, or a resin-based adhesive such as a thermosetting or thermoplastic resin. These adhesive materials are preferably highly flame resistant.

As described above, the partitioning member 1 preferably has light reflectivity. This allows the first lateral walls 12, the second lateral walls 13, the third lateral walls 22, the fourth lateral walls 23, and the bottom parts 40 to efficiently reflect the light exiting from the light sources 63 in the upward direction.

The partitioning member 1 may be formed by using a resin containing a reflecting material such as particles of titanium oxide, aluminum oxide, or silicon oxide, or formed by using a resin not containing a reflecting material and disposing a reflective material on the surface. Alternatively, a resin containing micro air bubbles may be used. In this case, light is reflected at the interfaces between the air bubbles and the resin. Examples of resins used as the partitioning member 1 include thermoplastic resins, such as acrylic resins, polycarbonate resins, cyclic polyolefin resins, polyethylene terephthalate, polyethylene naphthalate, or polyester, and thermosetting resins such as epoxy resins or silicone resins. For the partitioning member 1, the reflectance is preferably set as 70% or higher with respect to the light exiting from the light sources 63.

The partitioning member 1 may be formed by employing a forming method which uses a die or by stereolithography, or prepared through a purchase of a partitioning member 1 having first wall parts 10, second wall parts 20 and bottom parts 40. For the forming method which uses a die, injecting molding, extruding, compression molding, vacuum forming, pressing, or the like is applicable. For example, a partitioning member 1 in which first wall parts 10, second wall parts 20 and bottom parts 40 are integrally formed can be obtained by vacuum forming using a reflective sheet made of PET or the like.

The planar light source 60 can include as an optical member a diffusion sheet disposed above the light sources 63 while interposing the partitioning member 1. Providing the planar light source 60 with a diffusion sheet can improve the uniformity of the light extracted from the planar light source 60. Moreover, the planar light source 60 can further include above the diffusion sheet at least one selected from the group consisting of a wavelength conversion sheet, a first prism sheet, a second prism sheet, and a polarization sheet. Providing the planar light source 60 with one or more of these optical members can further improve the uniformity of light. A wavelength conversion sheet, for example, can absorb a portion of the blue light from a light source and emit yellow light, green light and/or red light, thereby outputting white light. Because the wavelength conversion sheet is spaced apart from the light emitting elements 63a of the light sources 63, it can contain phosphors which are less resistant to heat or light intensity to present difficulties for use near the light emitting elements 63a. This can improve the performance of the planar light source 60 as a backlight. For the phosphor to be contained in the wavelength conversion sheet, yttrium aluminum garnet based phosphors (e.g., $Y_3(Al,Ga)_5O_{12}$:Ce), lutetium aluminum garnet based phosphors (e.g., $Lu_3(Al,Ga)_5O_{12}$:Ce), terbium aluminum garnet based phosphors (e.g., $Tb_3(Al,Ga)_5O_{12}$:Ce), CCA-based phosphors (e.g., $Ca_{10}(PO_4)_6Cl_2$:Eu), SAE-based phosphors (e.g., $Sr_4Al_{14}O_{25}$:Eu), chlorosilicate based phosphors (e.g., $Ca_8MgSi_4O_{16}Cl_2$:Eu), nitride based phosphors, such as β-SiAlON based phosphors (e.g., $(Si,Al)_3(O,N)_4$:Eu), α-SiAlON based phosphors (e.g., $Ca(Si,Al)_{12}(O,N)_{16}$:Eu), SLA based phosphors (e.g., $SrLiAl_3N_4$:Eu), CASN-based phosphors (e.g., $CaAlSiN_3$:Eu), or SCASN-based phosphors (e.g., $(Sr,Ca)AlSiN_3$:Eu), fluoride based phosphors, such as KSF-based phosphors (e.g., $K_2SiF_6$:Mn), KSAF-based phosphors (e.g., $K_2(Si_{0.99},Al_{0.01})F_{65.99}$:Mn), or MGF-based phosphors (e.g., $3.5MgO \cdot 0.5MgF_2 \cdot GeO_2$:Mn), phosphors having a Perovskite structure (e.g., $CsPb(F,Cl,Br,I)_3$), or quantum dot phosphors (e.g., CdSe, InP, $AgInS_2$ or $AgInSe_2$) can be used. In the case of having the encapsulating member 63b contain a phosphor, any of the phosphors described above can be used.

The planar light source 60 may be shaped to be in parallel with the X-Y plane, or curved towards the Z+ side or the Z− side relative to the X-Y plane. For example, it may have a curved shape in which the center of the planar light source 60 is depressed towards the Z− side in the X direction.

EXAMPLE

A planar light source A having the same structure as the planar light source 60 shown in FIG. 15 was produced. For the planar light source A, a partitioning member having the same quadrangular shape as the partitioning member 1 shown in FIG. 1 and the same cuts as those in the partitioning member 1B shown in FIG. 10 was used. In other words, a partitioning member in which the first cuts and the second cuts are alternately provided on the first ridges at the intersections intersected by the second ridges, and the first cuts and the second cuts are alternately provided on the second ridges at the intersections intersected by the first ridges was used. However, in the peripheral portion of the partitioning member, the peripheral first cuts and the peripheral second cuts being orthogonal to the outline (the sides of outer periphery) were provided. The length of the first cuts and the second cuts was about 3 mm, and the length of the peripheral first cuts and the peripheral second cuts was about 1.5 mm.

As a comparative example, a planar light source B which had the same structure as that of the planar light source A except for not having any cuts in the partitioning member was produced. For both the planar light source A and the planar light source B, the partitioning members were formed by using the same material. For the material for the partitioning members, polyethylene terephthalate (PET) was used.

With respect to the planar light source A and the planar light source B, as the initial data, the dimensions of the partitioning member in the longitudinal direction (the X direction) and the transverse direction (the Y direction) were measured. In both cases, X=225 mm and Y=127 mm.

Then the planar light source A and the planar light source B were stored under 100° C. condition, and the degree of shrinkage was investigated by measuring the dimensions of the partitioning members in the X direction and the Y direction 1000 hours later. Table 1 shows the results.

TABLE 1

|  | X Direction | Y Direction |
| --- | --- | --- |
| Planar Light Source A | 0.16 mm | 0.12 mm |
|  | (0.07%) | (0.26%) |
| Planar Light Source B | 0.63 mm | 0.42 mm |
|  | (0.28%) | (0.92%) |

As shown in Table 1, the dimensions of the partitioning member in the planar light source A having cuts in the partitioning member shrank 0.16 mm in the X direction and 0.12 mm in the Y direction. Expressed in terms of the shrinkage rate, 0.07% in the X direction and 0.26% in the Y direction. In contrast, the dimensions of the partitioning member in the planar light source B having no cuts in the partitioning member shrank 0.63 mm in the X direction and 0.42 mm in the Y direction. Expressed in terms of the shrinkage rate, 0.28% in the X direction and 0.92% in the Y direction.

As such, providing cuts in the partitioning member was confirmed to reduce the shrinkage of the partitioning member in the X direction and the Y direction under high temperature condition to about ⅓ to about ¼ as compared to the case in which no cut was formed in the partitioning member.

Second Embodiment

In a Second Embodiment, an example of a partitioning member having a structure in which two members are stacked will be explained.

Partitioning Member 2

Figure 17:
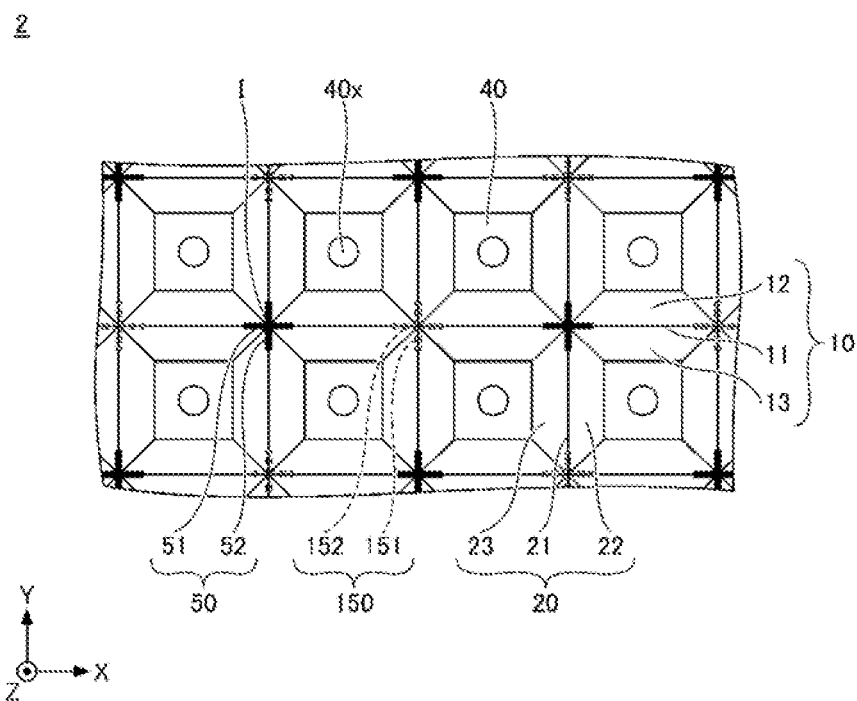
FIG. 17 is a partial plan view illustrating a partitioning member 2 (part 1).

FIG. 17 is a partial plan view (part 1) illustrating a partitioning member 2. FIG. 18 is a planar view (part 2) of the partitioning member 2 illustrating the state before stacking two members. The partitioning member 2 shown in FIG. 17 is one that has a lower member 1G disposed under the partitioning member 1A shown in FIG. 18.

In other words, the partitioning member 2 has a partitioning member 1A and a lower member 1G disposed under the partitioning member 1A. In the partitioning member 2, the partitioning member 1A is laid over the lower member 1G. The overall shape of the partitioning member 1A is the same as the partitioning member 1 shown in FIG. 1 or the like, and the positions and the shapes of the cuts are as explained with reference to FIG. 9.

The lower member 1G has a plurality of fourth wall parts 110 and a plurality of fifth wall parts 120. In the example shown in FIG. 18, the lower member 1G has a plurality of bottom parts 140, and an opening 140$x$ is provided in the bottom part 140. The bottom parts and the openings may be provided in only one of the partitioning member 1A and the lower member 1G, or both. In the case of providing the bottom parts and the openings in both the partitioning member 1A and the lower member 1G, the bottom parts 40 are positioned above the bottom parts 140, and the openings 40$x$ communicate with the openings 140$x$ when the partitioning member 1A is laid over the lower member 1G.

The fourth wall part 110 has a fourth ridge 111 extending in a first direction, a seventh lateral wall 112, and an eighth lateral wall 113. The upper edge of the seventh lateral wall 112 and the upper edge of the eighth lateral wall 113 are continuous. There is a space between the seventh lateral wall 112 and the eighth lateral wall 113.

A fourth ridge 111 is a line connecting the highest positions of a fourth wall part 110. The fourth ridge 111 in a cross section orthogonal to the fourth ridge 111 may have a pointed shape or a rounded shape. As explained with reference to the first ridges 11, the fourth ridge 111 may be shaped as a linearly extending extremely narrow flat part.

The fourth wall parts 110 are respectively positioned under the first wall parts 10 of the partitioning member 1A.

The fifth wall part 120 has a fifth ridge 121 extending in a second direction intersecting the first direction, a ninth lateral wall 122 and a tenth lateral wall 123. The upper edge of the ninth lateral wall 122 and the upper edge of the tenth lateral wall 123 are continuous. There is a space between the ninth lateral wall 122 and the tenth lateral wall 123.

A fifth ridge 121 is a line connecting the highest positions of a fifth wall part 120. The fifth ridge 121 in a cross section orthogonal to the fifth ridge 121 may have a pointed shape or a rounded shape. As explained with reference to the first ridges 11, the fifth ridge 121 may be shaped as a linearly extending extremely narrow flat part.

The fifth wall parts 120 are respectively positioned under the second wall parts 20 of the partitioning member 1A.

The lower member 1G has lower continuous cuts 150 in which a first lower cut 151 on a fifth ridge 121 and a second lower cut 152 on a fourth ridge 111 are continuous at each location. The first lower cuts 151 have a straight line shape that extends, for example, in the second direction Y, and the second lower cuts 152 have a straight line shape that extends, for example, in the first direction X. The lengths of the first lower cuts 151 and the second lower cuts 152 may be the same, for example, or different.

In a plan view, the lower continuous cuts 150 are cross-shaped.

In the partitioning member 1A, the continuous cuts 50 are provided to form a zigzag pattern. In the lower member 1G, the lower continuous cuts 150 are formed to form a zigzag pattern without overlapping the continuous cuts 50 of the partitioning member 1A in a plan view when the partitioning member 1A is laid over the lower member 1G.

The partitioning member 1A may be adhered to the lower member 1G or not. In the case of adhering the partitioning member 1A to the lower member 1G, an adhesive, double-sided tape, or the like can be used. For example, in the case in which both the partitioning member 1A and the lower member 1G have bottom parts, the bottom parts 40 of the partitioning member 1A and the bottom parts 140 of the lower member 1G may be adhered. The wall parts of the partitioning member 1A and the lower member 1G may be adhered without adhering the bottom parts. The bottom parts of the partitioning member 1A and the bottom parts of the lower member 1G may be adhered, and their wall parts may further be adhered.

The lower member 1G may have the same size as or a different size from the partitioning member 1A. For example, the lower member 1G can have the size such that the wall parts of the lower member 1G are in contact with the wall parts of the partitioning member 1A and the bottom parts of the lower member 1G are in contact with the bottom parts of the partitioning member 1A. Likewise, in the case of the lower member 1H described later, the size can be the same as or different from that of the partitioning member 1B.

As described above, in the partitioning member 2, the continuous cuts 50 and the lower continuous cuts 150 are positioned so as not to overlap one another in a plan view. Accordingly, in the case of using the partitioning member 2 in a planar light source, a similar effect to that in the partitioning member 1 can be achieved in reducing the shrinkage of the partitioning member 2.

In the case of using the partitioning member 2 in a planar light source, furthermore, a portion of the light from the light sources and a portion of the light returning from the optical sheet that passed through the cuts in the partitioning member 1A is reflected by the lower member 1G. This can reduce the decline in the amount of the light extracted from the planar light source as compared to the case in which continuous cuts 50 are provided at every intersection I in the partitioning member 1 shown in FIG. 3.

Partitioning Member 2A

Figure 19:
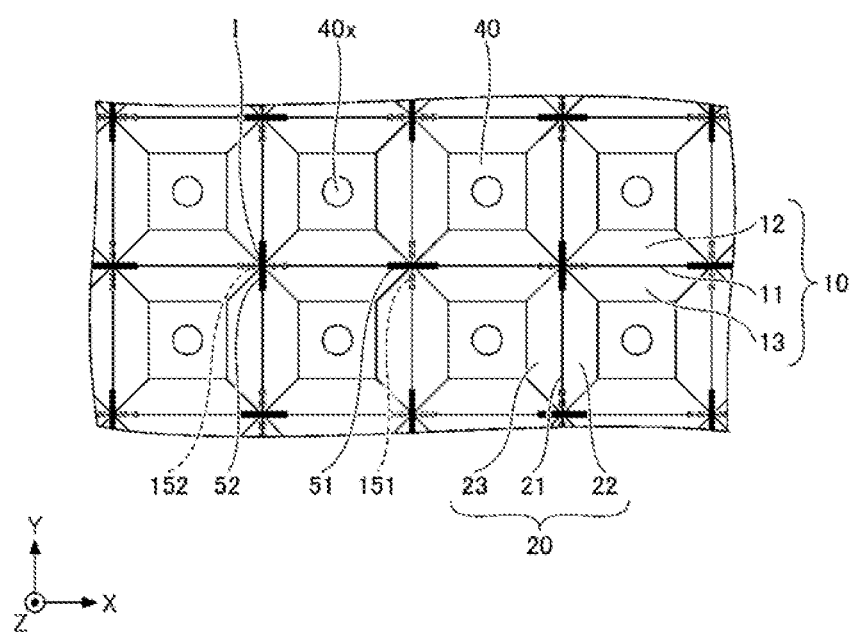
FIG. 19 is a partial plan view illustrating a partitioning member 2A (part 1).
Figure 20:
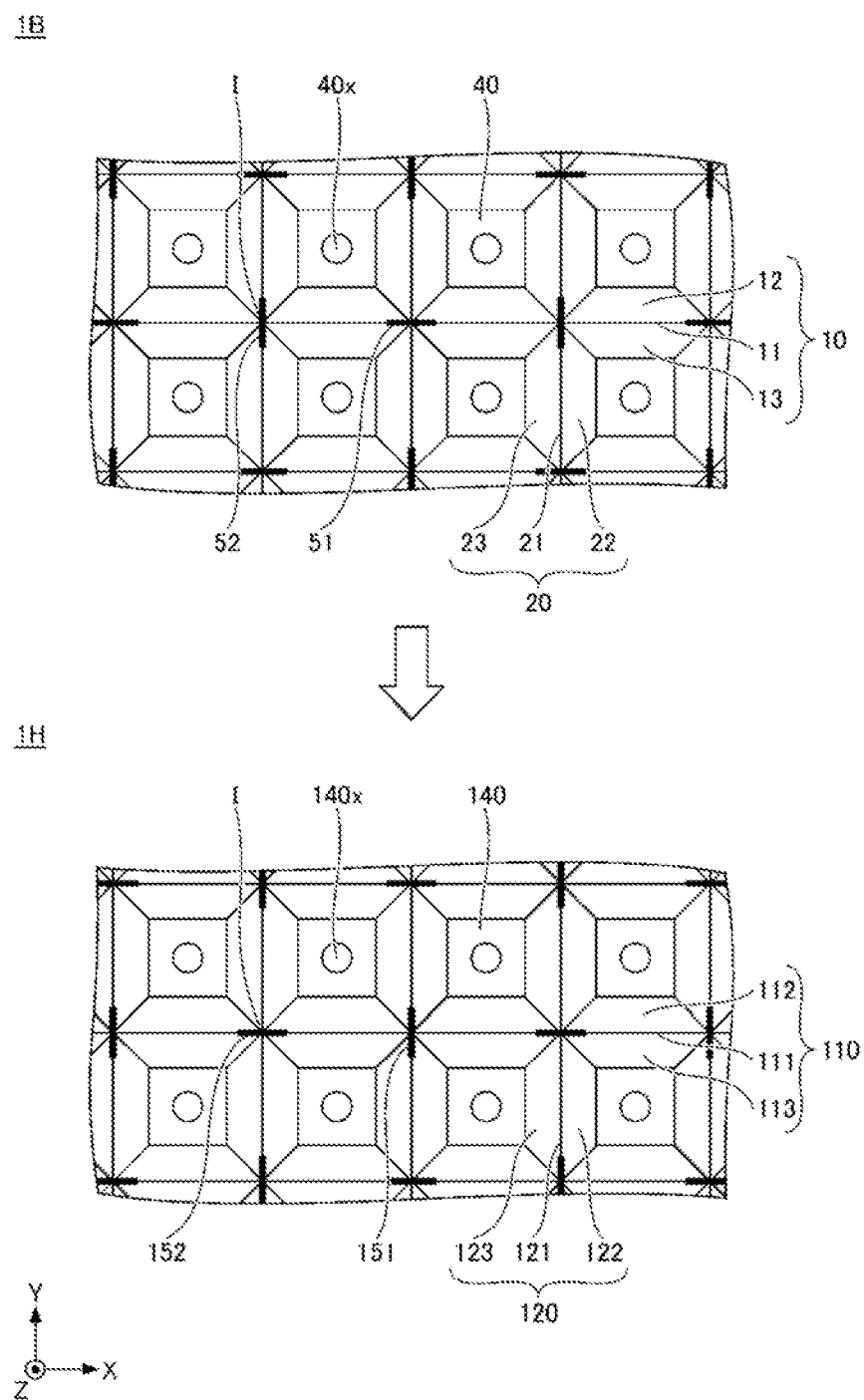
FIG. 20 is a partial plan view illustrating the partitioning member 2A (part 2).

FIG. 19 is a partial plan view (part 1) illustrating a partitioning member 2A. FIG. 20 is a partial plan view (part 2) of the partitioning member 2A illustrating the state before stacking two members. The partitioning member 2A shown in FIG. 19 is after disposing a lower member 1H under the partitioning member 1B shown in FIG. 20. The partitioning member 2A shown in FIG. 19 differs from the partitioning member 2 shown in FIG. 17 in terms of the positional relationship of the cuts.

In the partitioning member 2A, when the partitioning member 1B is laid over the lower member 1H, the first cuts 51 intersect the first lower cuts 151, and the second cuts 52 intersect the second lower cuts 152 in a plan view. For example, in a plan view, the first cuts 51 intersect the first lower cuts 151 to form a cross shape at each location, and the second cuts 52 intersect the second lower cuts 152 to form a cross shape at each location.

As described above, in the partitioning member 2A, at every intersection I in a plan view, a first cut 51 intersects a first lower cut 151 or a second cut 52 intersects a second lower cut 152. Accordingly, in the case of using the partitioning member 2A in a planar light source, a similar effect to that in the partitioning member 1 can be achieved in reducing the shrinkage of the partitioning member 2.

In the case of using the partitioning member 2A in a planar light source, furthermore, a portion of the light from the light sources and a portion of the light returning from the optical sheet that passed through the cuts in the partitioning member 1B is reflected by the lower member 1H. This can reduce the decline in the amount of light extracted from the planar light source as compared to the case in which continuous cuts 50 are provided at every intersection I in the partitioning member 1 shown in FIG. 3. The partitioning member 2 in which the continuous cuts 50 are completely blocked by the lower member 1G is more effective in reducing the decline in the amount of the light extracted than the partitioning member 2A.

Variation of Second Embodiment

The partitioning member 2 may be provided with at least one continuous cut 50 in the partitioning member 1A and at least one lower continuous cut 150 in the lower member 1G at a position not overlapping the continuous cut 50 in a plan view.

Third Embodiment

In a Third Embodiment, an example of a liquid crystal display device that employs a planar light source 60 as a light source for the backlight will be explained.

Figure 21:
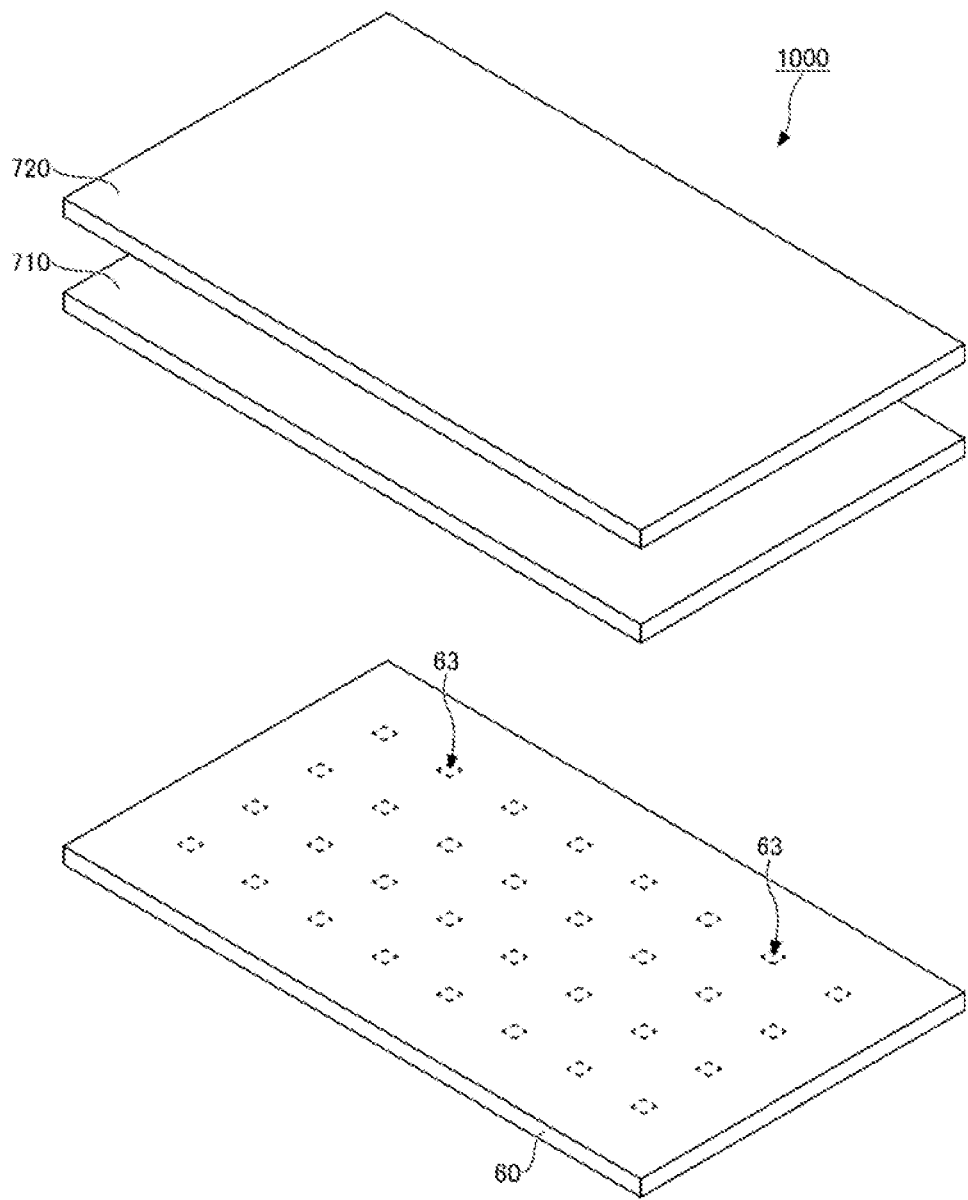
FIG. 21 is a component diagram of a liquid crystal display device according to a Third Embodiment.

FIG. 21 is a component diagram of a liquid crystal display device according to the Third Embodiment. As shown in FIG. 21, the liquid crystal display device 1000 includes, from the top, a liquid crystal panel 720, an optical sheet 710, and a planar light source 60. The planar light source 60 may include as an optical member DBEF (reflective polarizing sheet), BEF (brightness enhancement sheet), color filter, or the like above the light sources 63.

The liquid crystal display device 1000 is a so-called direct lit liquid crystal display device in which the planar light source 60 is behind the liquid crystal panel 72. In the liquid crystal display device 1000, the light exiting from the planar light source 60 irradiates on the liquid crystal panel 720.

From the standpoint of making the planar light source thin, the thickness of the planar light source can be set as 15 mm at most. This can make the planar light source thin, thereby reducing the thickness of the liquid crystal display device 1000.

The use of the planar light source 60 is not limited to the backlight of the liquid crystal display device 1000. The planar light source 60 can be utilized as the backlight of a television, tablet, smartphone, smartwatch, head up display, digital signage, signboard, or the like. The planar light source 60 can also be utilized as a light source for lighting purposes, such as an emergency light, line light, various types of illumination, and automotive lighting.

Preferable embodiments of the present disclosure have been described in the foregoing. However, without being limited by the embodiments described above, various modifications and substitutions can be made without deviating from the scope of the claims.

What is claimed is:

1. A planar light source comprising:
a substrate;
a plurality of light sources arranged on the substrate; and
at least one partitioning member disposed on the substrate, wherein
the at least one partitioning member includes
a plurality of first wall parts defining a plurality of first ridges extending in a first direction,
a plurality of second wall parts defining a plurality of second ridges extending in a second direction that intersects the first direction, and
a plurality of partitioned regions each including an opposing pair of the first wall parts and an opposing pair of the second wall parts, and being surrounded by the first ridges and the second ridges in a plan view, each of the first wall parts and the second wall parts having a constant height:
the plurality of partitioned regions are arranged in the first direction and in the second direction,
at least one first cut is defined on at least one of the first ridges,
at least one second cut is defined on at least one of the second ridges,
the at least one first cut and the at least one second cut are spaced apart from each other in the plan view, and
at least one of the light sources is arranged in a corresponding one of the partitioned regions.

2. The planar light source according to claim 1, wherein the at least one first cut and the at least one second cut are alternately provided on the first ridges at a plurality of intersections intersected by the second ridges.

3. The planar light source according to claim 2, wherein the at least one first cut and the at least one second cut are not provided at the plurality of intersections, and provided between adjacent intersections of the plurality of intersections so as not to be in contact with the adjacent intersections.

4. The planar light source according to claim 1, wherein the at least one first cut and the at least one second cut are alternately provided on the second ridges at a plurality of intersections intersected by the first ridges.

5. The planar light source according to claim 1 further comprising
a lower member disposed under the partitioning member, the lower member including
a plurality of fourth wall parts positioned under the first wall parts, and defining a plurality of fourth ridges extending in the first direction, and
a plurality of fifth wall parts positioned under the second wall parts, and defining a plurality of fifth ridges extending in the second direction, wherein
at least one first lower cut is provided on at least one of the fifth ridges at a position intersecting one of the first cuts in the plan view, and
at least one second lower cut is provided on at least one of the fourth ridges at a position intersecting one of the second cuts in the plan view.

6. The planar light source according to claim 1, wherein the second wall parts each has a third lateral wall and a fourth lateral wall interposing the second ridge, and
the third lateral wall and the fourth lateral wall are at least partially in contact with each other while the second cut is interposed between the third lateral wall and the fourth lateral wall.

7. The planar light source according to claim 1, wherein
the first wall parts each has a first lateral wall and a second lateral wall interposing the first ridge, and
the first lateral wall and the second lateral wall are at least partially in contact with each other while the first cut is interposed between the first lateral wall and the second lateral wall.

8. The planar light source according to claim 1 further comprising:
at least one peripheral first cut provided on at least one of the first ridges, and positioned along an outline of the partitioning member; and
at least one peripheral second cut provided on at least one of the second ridges, and positioned along the outline of the partitioning member.

9. The planar light source according to claim 8, wherein each of the at least one peripheral first cut and the at least one peripheral second cut is formed to be orthogonal to the outline of the partitioning member.

10. The planar light source according to claim 8, wherein a length of the at least one peripheral first cut and a length of the at least one peripheral second cut are shorter than a length of the at least one first cut and a length of the at least one second cut, respectively.

11. The planar light source according to claim 10, wherein the length of the at least one peripheral first cut and the length of the at least one peripheral second cut are one half of the length of the at least one first cut and the length of the at least one second cut, respectively.

12. The planar light source according to claim 1, wherein the at least one partitioning member has a quadrangular shape in the plan view.

13. The planar light source according to claim 1, wherein the at least one partitioning member has an irregular shape in the plan view.

14. The planar light source according to claim 1, wherein a length of the at least one first cut, a length of the at least one second cut, or both increases as a position of the cut becomes closer to a perimeter of the partitioning member.

15. A liquid crystal display device comprising:
a back light source having the planar light source according to claim 1.

16. A partitioning member comprising:
a plurality of first wall parts defining a plurality of first ridges extending in a first direction;
a plurality of second wall parts defining a plurality of second ridges extending in a second direction that intersects the first direction; and
a plurality of partitioned regions each including an opposing pair of the first wall parts and an opposing pair of the second wall parts, and being surrounded by the first ridges and the second ridges in a plan view, each of the first wall parts and the second wall parts having a constant height, wherein
the plurality of partitioned regions are arranged in the first direction and in the second direction,
at least one first cut is defined on at least one of the first ridges,
at least one second cut is defined on at least one of the second ridges, and
the at least one first cut and the at least one second cut are spaced apart from each other in the plan view.

* * * * *